US012570329B2

(12) United States Patent
Zeng et al.

(10) Patent No.: US 12,570,329 B2
(45) Date of Patent: Mar. 10, 2026

(54) SYSTEMS AND METHODS FOR ACTOR MOTION FORECASTING WITHIN A SURROUNDING ENVIRONMENT OF AN AUTONOMOUS VEHICLE

(71) Applicant: Aurora Operations, Inc., Pittsburgh, PA (US)

(72) Inventors: Wenyuan Zeng, Toronto (CA); Renjie Liao, Toronto (CA); Raquel Urtasun, Toronto (CA); Ming Liang, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 295 days.

(21) Appl. No.: 18/346,518

(22) Filed: Jul. 3, 2023

(65) Prior Publication Data

US 2023/0347941 A1    Nov. 2, 2023

Related U.S. Application Data

(63) Continuation of application No. 17/528,661, filed on Nov. 17, 2021, now Pat. No. 11,731,663.

(Continued)

(51) Int. Cl.
| | |
|---|---|
| B60W 60/00 | (2020.01) |
| B60W 40/072 | (2012.01) |
| G06N 20/00 | (2019.01) |

(52) U.S. Cl.
CPC .... B60W 60/00276 (2020.02); B60W 40/072 (2013.01); G06N 20/00 (2019.01);
(Continued)

(58) Field of Classification Search
None
See application file for complete search history.

(56) References Cited

U.S. PATENT DOCUMENTS

| | | |
|---|---|---|
| 2017/0263130 A1 | 9/2017 | Sane et al. |
| 2019/0049970 A1 | 2/2019 | Djuric et al. |

(Continued)

OTHER PUBLICATIONS

Argoverse Motion Forecasting Competition. Dec. 1, 2019, https://eval.ai/challenge/454/evaluation, retrieved on Jun. 8, 2022, 14 pages.

(Continued)

*Primary Examiner* — David P. Merlino
(74) *Attorney, Agent, or Firm* — Dority & Manning, P.A.

(57) ABSTRACT

Systems and methods are provided for forecasting the motion of actors within a surrounding environment of an autonomous platform. For example, a computing system of an autonomous platform can use machine-learned model(s) to generate actor-specific graphs with past motions of actors and the local map topology. The computing system can project the actor-specific graphs of all actors to a global graph. The global graph can allow the computing system to determine which actors may interact with one another by propagating information over the global graph. The computing system can distribute the interactions determined using the global graph to the individual actor-specific graphs. The computing system can then predict a motion trajectory for an actor based on the associated actor-specific graph, which captures the actor-to-actor interactions and actor-to-map relations.

19 Claims, 10 Drawing Sheets

Related U.S. Application Data

(60) Provisional application No. 63/114,855, filed on Nov. 17, 2020.

(52) U.S. Cl.
CPC .............. *B60W 2554/4041* (2020.02); *B60W 2554/4044* (2020.02)

(56) References Cited

U.S. PATENT DOCUMENTS

| | | |
|---|---|---|
| 2019/0152490 A1 | 5/2019 | Lan et al. |
| 2019/0318041 A1 | 10/2019 | Bai et al. |
| 2020/0207339 A1 | 7/2020 | Neil et al. |
| 2020/0307563 A1 | 10/2020 | Ghafarianzadeh et al. |
| 2021/0009163 A1* | 1/2021 | Urtasun ................... G08G 1/20 |
| 2021/0078603 A1 | 3/2021 | Nakhaei Sarvedani et al. |
| 2021/0139026 A1 | 5/2021 | Phan et al. |
| 2021/0174668 A1 | 6/2021 | Sun et al. |
| 2021/0295171 A1 | 9/2021 | Kamenev et al. |
| 2021/0312811 A1 | 10/2021 | Ohlarik et al. |

OTHER PUBLICATIONS

Alahi et al, "Social LSTM: Human Trajectory Prediction in Crowded Spaces", Conference in Computer Vision and Pattern Recognition, Jun. 26-Jul. 1, 2016, Las Vegas, Nevada, United States, 11 pages.

Ba et al, "Layer Normalization", arXiv:1607.06450v1, Jul. 21, 2016, 14 pages.

Bansal et al, "ChauffeurNet: Learning to Drive by Imitating the Best and Synthesizing the Worst", arXiv:1812.03079v1, Dec. 7, 2018, 20 pages.

Bruna et al, "Spectral Networks and Locally Connected Networks on Graphs", arXiv:1312.6203v3, May 21, 2014, 14 pages.

Casas et al, "SpAGNN: Spatially-Aware Graph Neural Networks for Relational Behavior Forecasting from Sensor Data", arXiv:1910. 08233V1, Oct. 18, 2019, 11 pages.

Casas et al, "Implicit Latent Variable Model for Scene-Consistent Motion Forecasting", arXiv:2007.12036v1, Jul. 23, 2020, 44 pages.

Casas et al, "IntentNet: Learning to Predict Intention from Raw Sensor Data", arXiv:2101.07907v1, Jan. 20, 2021, 10 pages.

Chai et al, "MultiPath: Multiple Probabilistic Anchor Trajectory Hypotheses for Behavior Prediction", arXiv:1910.05449v1, Oct. 12, 2019, 14 pages.

Chang et al, "Argoverse: 3D Tracking and Forecasting with Rich Maps", Conference on Computer Vision and Pattern Recognition, Jun. 16-20, 2019, Long Beach, California, United States, pp. 8748-8757.

Choi et al, "A Unified Framework for Multi-Target Tracking and Collective Activity Recognition", European Conference on Computer Vision, Oct. 7-13, 2012, Firenze, Italy, 14 pages.

Choi et al, "Understanding Collective Activities of People from Videos", Transactions on Pattern Analysis and Machine Intelligence, vol. 36, No. 6, Jun. 2014, pp. 1242-1257.

Cui et al, "Multimodal Trajectory Predictions for Autonomous Driving using Deep Convolutional Networks", arXiv:1809. 10732v2, Mar. 1, 2019, 7 pages.

Deo et al, "How Would Surround Vehicles Move? A Unified Framework for Maneuver Classification and Motion Prediction", arXiv:1801.06523v1, Jan. 19, 2018, 12 pages.

Deo et al, "Convolutional Social Pooling for Vehicle Trajectory Prediction", arXiv:1805.06771v1, May 15, 2018, 9 pages.

Gao et al, "VectorNet: Encoding HD Maps and Agent Dynamics for Vectorized Representation", Conference on Computer Vision and Pattern Recognition, Jun. 14-19, 2020, Virtual, pp. 11525-11533.

Garcia et al, "Few-Shot Learning with Graph Neural Networks", arXiv:1711.04043v3, Feb. 20, 2018, 13 pages.

Gupta et al, "Social GAN: Socially Acceptable Trajectories with Generative Adversarial Networks", arXiv:1803.10892v1, Mar. 29, 2018, 10 pages.

Hamilton et al, Inductive Representation Learning on Large Graphs, Conference on Neural Information Processing Systems, Dec. 4-9, 2017, Long Beach, California, United States, 11 pages.

He et al, "Mask R-CNN", arXiv:1703.06870v3, Jan. 24, 2018, 12 pages.

Helbing et al, "Social Force Model for Pedestrian Dynamics", Physical Review E, vol. 51, No. 5, May 1995, pp. 4282-4286.

Hu; "Collaborative Motion Prediction via Neural Motion Message Passing," 2020 IEEE/CVF Conference on Computer Vision and Pattern Recognition (CVPR), Oct. 2020, pp. 6318-6327, doi: 10.1109/ CVPR42600.2020.00635; https://ieeexplore.ieee.org/abstract/ document/ 9156688 (Year: 2020).

Jain et al, "Discrete Residual Flow for Probabilistic Pedestrian Behavior Prediction", arXiv:1910.08041v1, Oct. 17, 2019, 13 pages.

Khandelwal; "What-If Motion Prediction for Autonomous Driving"; Aug. 2020; Co RR, 2008.10587; https://arxiv.org/abs/2008. 10587 ( Year: 2020).

Kingma et al, "Adam: A Method for Stochastic Optimization", arXiv:1412.6980v9, Jan. 30, 2017, 15 pages.

Kipf et al, "Semi-Supervised Classification with Graph Convolutional Networks", arXiv:1609.02907v4, Feb. 22, 2017, 14 pages.

Lee et al, "Desire: Distant Future Prediction in Dynamic Scenes with Interacting Agents", arXiv:1704.04394v1, Apr. 14, 2017, 10 pages.

Li et al, "End-to-End Contextual Perception and Prediction with Interaction Transformer", arXiv:2008.05927v1, Aug. 13, 2020, 8 pages.

Li et al, "Situation Recognition with Graph Neural Networks", arXiv:1708.04320v1, Aug. 14, 2017, 22 pages.

Li et al, "Gated Graph Sequence Neural Networks", arXiv:1511. 05493v4, Sep. 22, 2017, 20 pages.

Liang et al, "Learning Lane Graph Representations for Motion Forecasting", arXiv:2007.13732v1, Jul. 27, 2020, 18 pages.

Liao et al, "LanczosNet: Multi-Scale Deep Graph Convolutional Networks", arXiv:1901.01484v2, Oct. 23, 2019, 18 pages.

Ma et al, "Forecasting Interactive Dynamics of Pedestrians with Fictitious Play", arXiv: 1604.01431v3, Mar. 28, 2017, 9 pages.

Mehran et al, "Abnormal Crowd Behavior Detection using Social Force Model", Conference on Computer Vision and Pattern Recognition, Jun. 22-24, 2009, Miami, Florida, United States, 8 pages.

Mercat et al, "Multi-Head Attention for Multi-Modal Joint Vehicle Motion Forecasting", arXiv:1910.03650v3, Dec. 20, 2019, 7 pages.

Monti et al, "Geometric Deep Learning on Graphs and Manifolds using Mixture Model CNNs", arXiv:1611.08402v3, Dec. 6, 2016, 13 pages.

Nair et al, "Rectified Linear Units Improve Restricted Boltzmann Machines", International Conference on Machine Learning, Jun. 21-24, 2010, Haifa, Israel, 8 pages.

Phan-Minh et al., "CoverNet: Multimodal Behavior Prediction using Trajectory Sets", Conference on Computer Vision and Pattern Recognition, Jun. 14-19, 2020, Virtual, pp. 14074-14083.

Qi et al, 3D Graph Neural Networks for RGBD Semantic Segmentation, International Conference on Computer Vision, Oct. 22-29, 2017, Venice, Italy, pp. 5199-5208.

Ren et al, "Faster R-CNN: Towards Real-Time Object Detection with Region Proposal Networks", arXiv:1506.01497v3, Jan. 6, 2016, 14 pages.

Rhinehart et al, "R2P2: A ReparameteRized Pushforward Policy for Diverse, Precise Generative Path Forecasting", European Conference on Computer Vision, Sep. 8-14, 2018, Munich, Germany, 17 pages.

Rhinehart et al, PRECOG: PREdiction Conditioned on Goals in Visual Multi-Agent Settings, arXiv:1905.01296v3, Sep. 30, 2019, 24 pages.

Sadat et al, "Perceive, Predict, and Plan: Safe Motion Planning Through Interpretable Semantic Representations", arXiv:2008. 05930v1, Aug. 13, 2020, 28 pages.

Sadeghian et al, "SoPhie: An Attentive GAN for Predicting Paths Compliant to Social and Physical Constraints", arXiv:1806. 01482v2, Sep. 20, 2018, 9 pages.

Sadeghian et al, "CAR-Net: Clairvoyant Attentive Recurrent Network", arXiv:1711.10661v3, Jul. 31, 2018, 17 pages.

(56)                  References Cited

OTHER PUBLICATIONS

Scarselli et al, "The Graph Neural Network Model", Transactions on Neural Networks, vol. 20, No. 1, Jan. 2009, pp. 61-80.

Shrivastava et al, "Training Region-Based Object Detectors with Online Hard Example Mining", arXiv:1604.03540v1, Apr. 12, 2016, 9 pages.

Song et al, "PiP: Planning Informed Trajectory Prediction for Autonomous Driving", arXiv:2003.11476v2, Jan. 18, 2021, 16 pages.

Sun et al, "Relational Action Forecasting", arXiv:1904.04231v1, Apr. 8, 2019, 11 pages.

Tang et al, "Multiple Futures Prediction", arXiv:1911.00997v2, Dec. 6, 2019, 17 pages.

Teney et al, "Graph-Structured Representations for Visual Question Answering", arXiv:1609.05600v2, Mar. 30, 2017, 17 pages.

Vaswani et al, "Attention Is All You Need", arXiv:1706.03762v5, Dec. 6, 2017, 15 pages.

Vemula et al, "Social Attention: Modeling Attention in Human Crowds", arXiv:1710.04689v2, Oct. 29, 2018, 7 pages.

Wang et al, "Deep Parametric Continuous Convolutional Neural Networks", arXiv:2101.06742v1, Jan. 17, 2021, 18 pages.

Yamaguchi et al, "Who Are You With and Where Are You Going?", Conference on Computer Vision and Pattern Recognition, Jun. 21-23, 2011, Colorado Springs, Colorado, United States, pp. 1345-1352.

Yu et al, "Multi-Scale Context Aggregation by Dilated Convolutions", arXiv:1511.07122v3, Apr. 20, 2016, 13 pages.

Zeng et al, "End-to-End Interpretable Neural Motion Planner", arXiv:2101.06679v1, Jan. 17, 2021, 10 pages.

Zeng et al., "DSDNet: Deep Structured Self-Driving Network", arXiv:2008.06041v1, Aug. 13, 2020, 24 pages.

Zhao et al., "TNT: Target-DriveN Trajectory Prediction", arXiv:2008.08294v2, Aug. 21, 2020, 12 pages.

Zhao et al., "Multi-Agent Tensor Fusion for Contextual Trajectory Prediction", arXiv:1904.04776v2, Jul. 28, 2019, 9 pages.

* cited by examiner

300

ACTOR ◄ - - - ► GRAPH

INTERACTION ◄ - - - ► GRAPH-TO-GRAPH

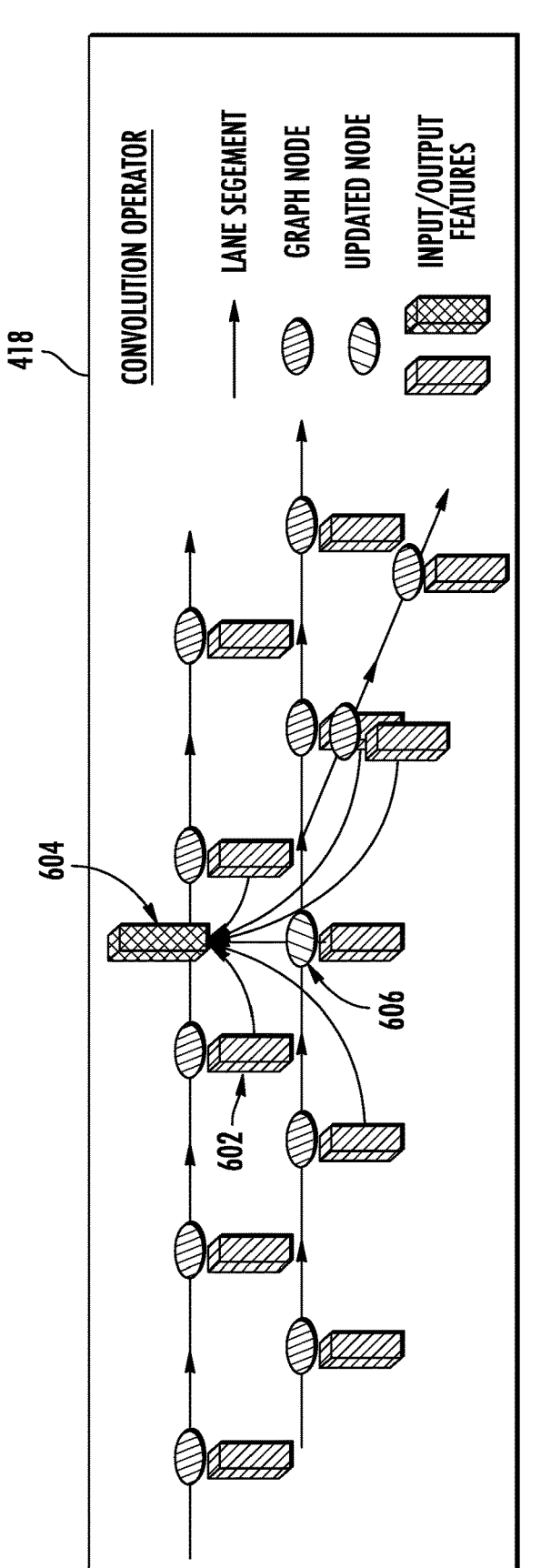
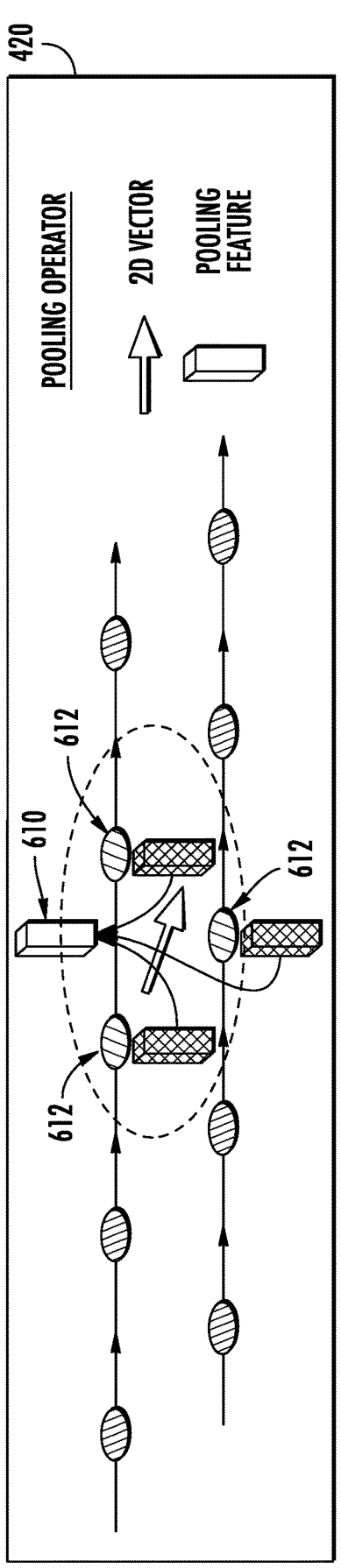
*FIG. 6*

700

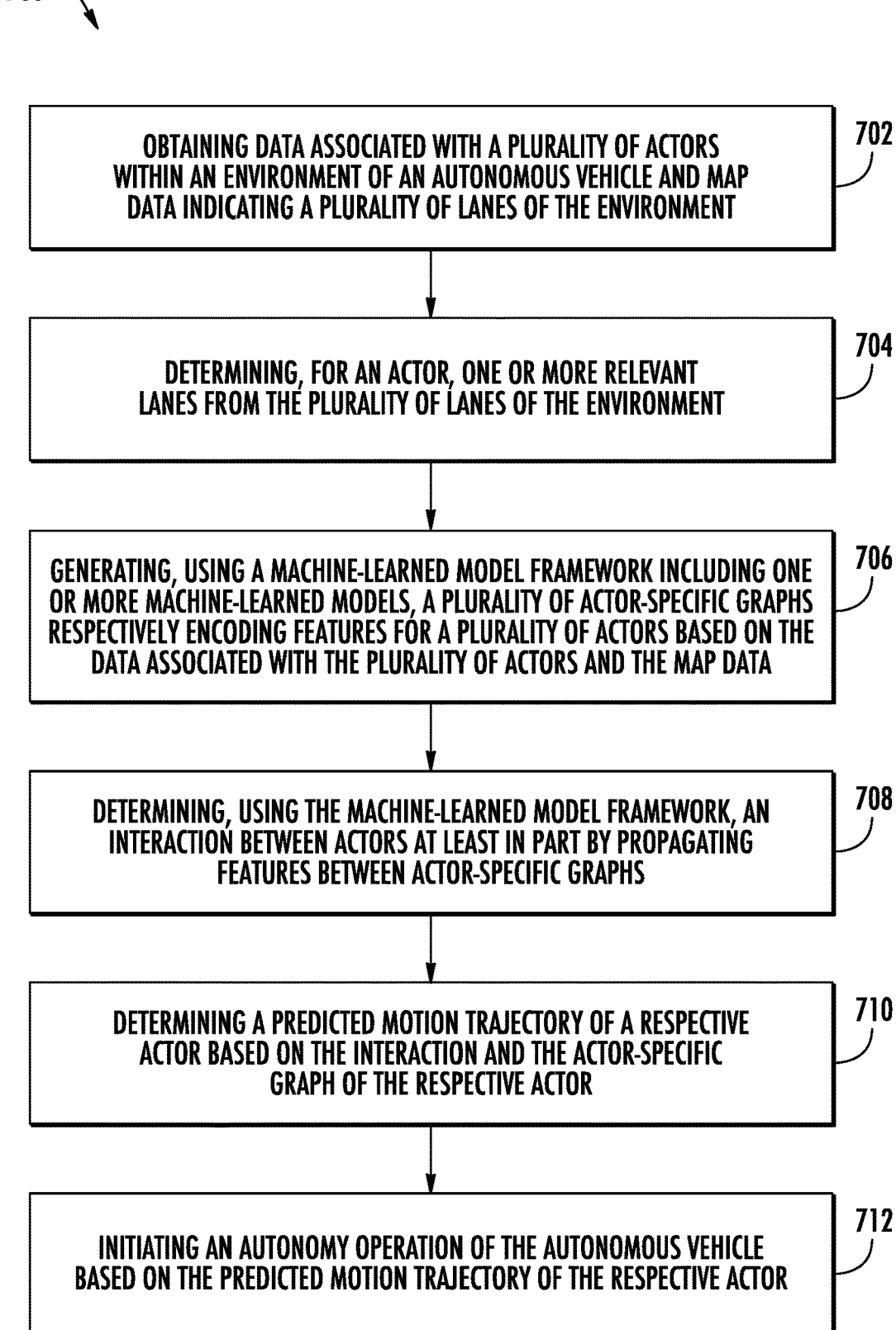

OBTAINING DATA ASSOCIATED WITH A PLURALITY OF ACTORS WITHIN AN ENVIRONMENT OF AN AUTONOMOUS VEHICLE AND MAP DATA INDICATING A PLURALITY OF LANES OF THE ENVIRONMENT — 702

DETERMINING, FOR AN ACTOR, ONE OR MORE RELEVANT LANES FROM THE PLURALITY OF LANES OF THE ENVIRONMENT — 704

GENERATING, USING A MACHINE-LEARNED MODEL FRAMEWORK INCLUDING ONE OR MORE MACHINE-LEARNED MODELS, A PLURALITY OF ACTOR-SPECIFIC GRAPHS RESPECTIVELY ENCODING FEATURES FOR A PLURALITY OF ACTORS BASED ON THE DATA ASSOCIATED WITH THE PLURALITY OF ACTORS AND THE MAP DATA — 706

DETERMINING, USING THE MACHINE-LEARNED MODEL FRAMEWORK, AN INTERACTION BETWEEN ACTORS AT LEAST IN PART BY PROPAGATING FEATURES BETWEEN ACTOR-SPECIFIC GRAPHS — 708

DETERMINING A PREDICTED MOTION TRAJECTORY OF A RESPECTIVE ACTOR BASED ON THE INTERACTION AND THE ACTOR-SPECIFIC GRAPH OF THE RESPECTIVE ACTOR — 710

INITIATING AN AUTONOMY OPERATION OF THE AUTONOMOUS VEHICLE BASED ON THE PREDICTED MOTION TRAJECTORY OF THE RESPECTIVE ACTOR — 712

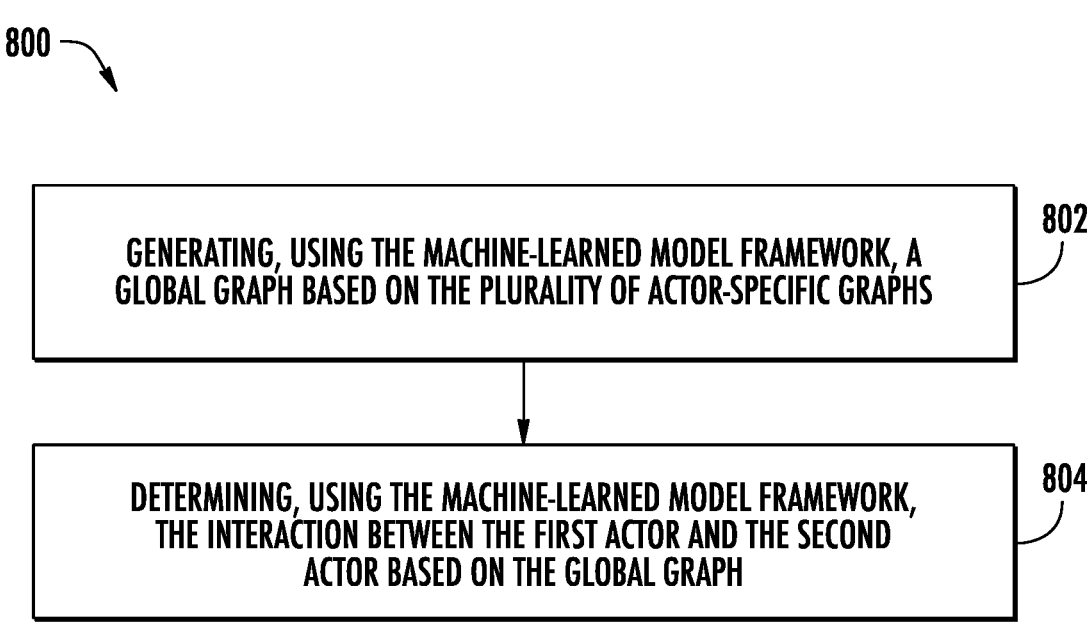

GENERATING, USING THE MACHINE-LEARNED MODEL FRAMEWORK, A GLOBAL GRAPH BASED ON THE PLURALITY OF ACTOR-SPECIFIC GRAPHS
802

DETERMINING, USING THE MACHINE-LEARNED MODEL FRAMEWORK, THE INTERACTION BETWEEN THE FIRST ACTOR AND THE SECOND ACTOR BASED ON THE GLOBAL GRAPH
804

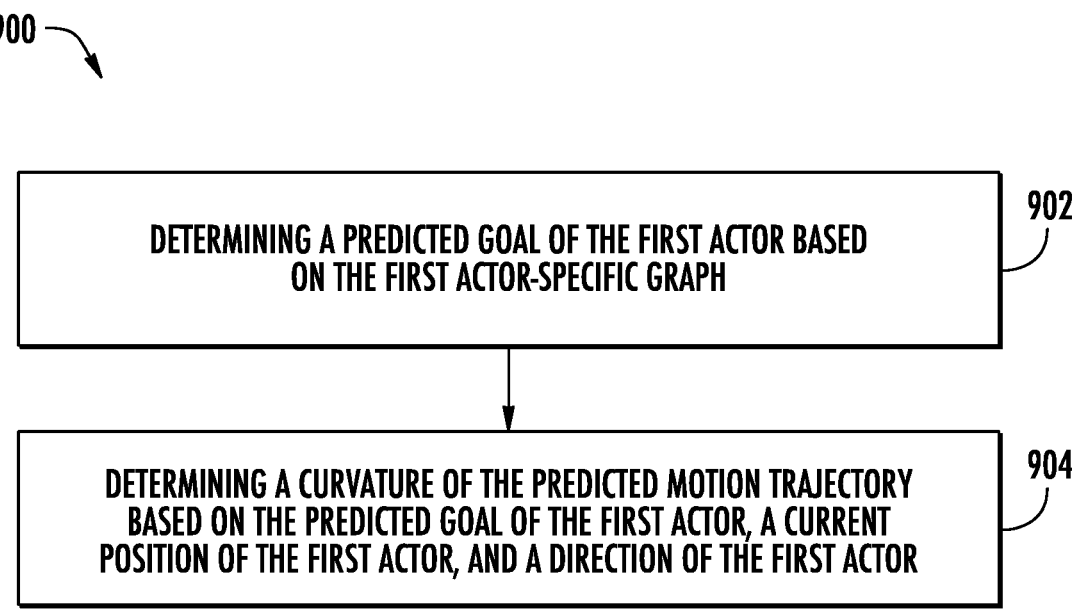

DETERMINING A PREDICTED GOAL OF THE FIRST ACTOR BASED ON THE FIRST ACTOR-SPECIFIC GRAPH
902

DETERMINING A CURVATURE OF THE PREDICTED MOTION TRAJECTORY BASED ON THE PREDICTED GOAL OF THE FIRST ACTOR, A CURRENT POSITION OF THE FIRST ACTOR, AND A DIRECTION OF THE FIRST ACTOR
904

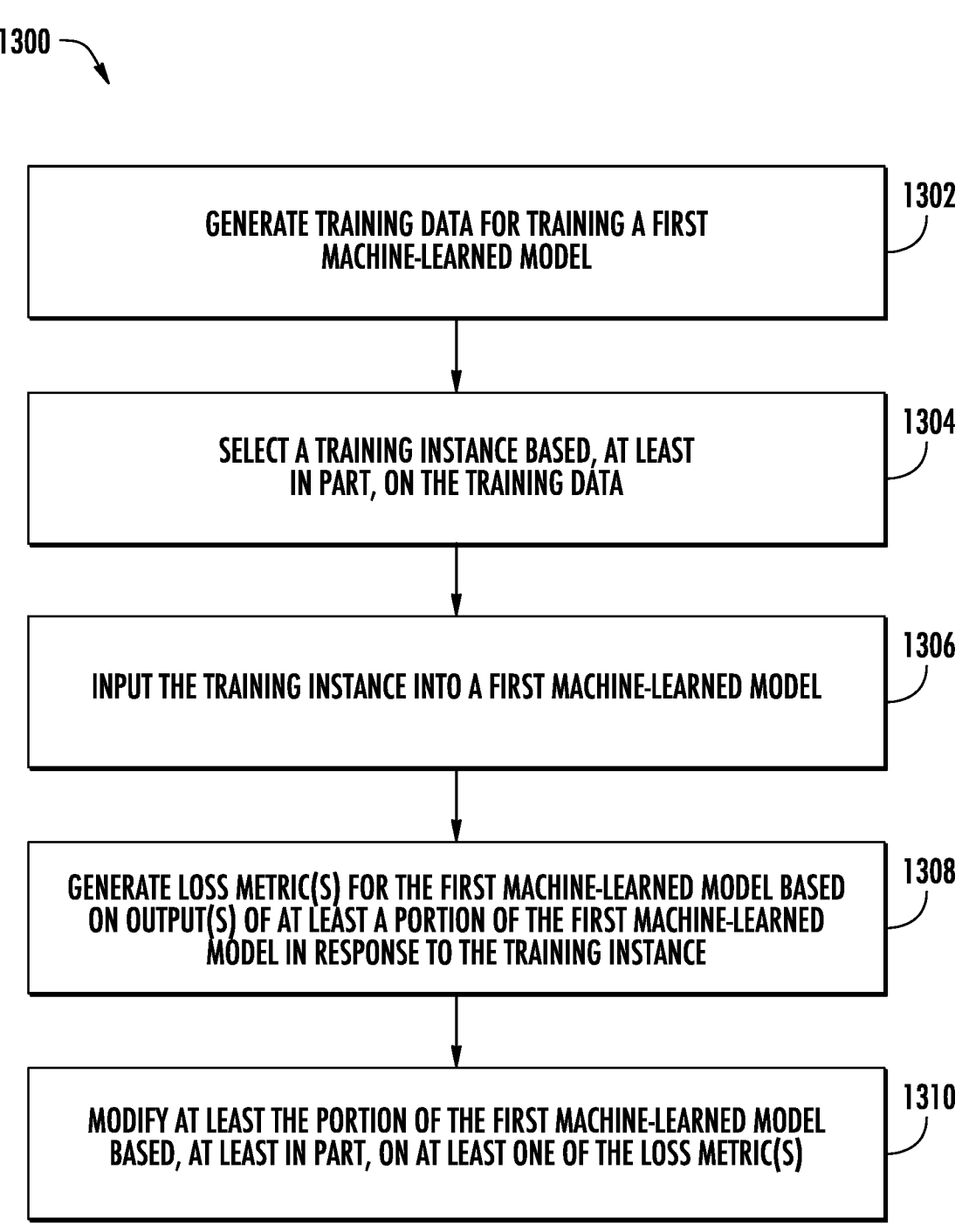

1302

GENERATE TRAINING DATA FOR TRAINING A FIRST
MACHINE-LEARNED MODEL

1304

SELECT A TRAINING INSTANCE BASED, AT LEAST
IN PART, ON THE TRAINING DATA

1306

INPUT THE TRAINING INSTANCE INTO A FIRST MACHINE-LEARNED MODEL

1308

GENERATE LOSS METRIC(S) FOR THE FIRST MACHINE-LEARNED MODEL BASED
ON OUTPUT(S) OF AT LEAST A PORTION OF THE FIRST MACHINE-LEARNED
MODEL IN RESPONSE TO THE TRAINING INSTANCE

1310

MODIFY AT LEAST THE PORTION OF THE FIRST MACHINE-LEARNED MODEL
BASED, AT LEAST IN PART, ON AT LEAST ONE OF THE LOSS METRIC(S)

FIG. 11

SYSTEMS AND METHODS FOR ACTOR MOTION FORECASTING WITHIN A SURROUNDING ENVIRONMENT OF AN AUTONOMOUS VEHICLE

PRIORITY CLAIM

The present application is a continuation of U.S. application Ser. No. 17/528,661 having a filing date of Nov. 17, 2021, which is based on and claims the benefit of U.S. Provisional Patent Application No. 63/114,855 having a filing date of Nov. 17, 2020. Applicant claims priority to and the benefit of each of such applications and incorporates all such applications herein by reference in its entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments.

The present disclosure is directed to improved systems and methods for forecasting the motion of actors within a surrounding environment of an autonomous platform. For instance, an autonomous vehicle can operate within an environment such as a highway scenario that includes a plurality of lanes. A plurality of actors (e.g., other vehicles) can move within the lanes. The technology of the present disclosure provides a graph-centric motion forecasting model framework that improves the ability of the autonomous vehicle to predict the motion of these actors within the lanes.

More particularly, the autonomous vehicle can represent an actor and its context by constructing an actor-specific graph (e.g., a Lane-graph Region-of-Interest (LaneRoI)) using a machine-learned model framework. For example, the graph-centric motion forecasting model can include machine-learned model(s) that utilize a specially designed graph encoder to encode an actor-specific graph (e.g., a local lane graph representation per actor) with past motions of an actor and the local map topology. The actor-specific graph can include: (i) nodes that represent lane segments of the lanes within the environment that are relevant to an actor; (ii) edges that represent the relationships between the lane segments (e.g., left, right, predecessor, successor); and (iii) node embeddings that encode the past motion of the actor and map features. Each actor-specific graph can focus on the lane topology that is relevant to the specific actor given its past motion, current position, and heading.

Furthermore, to help better model interactions, an autonomous vehicle can project the actor-specific graphs of all actors to a global graph. The global graph can allow the autonomous vehicle to determine which actors may interact with one another by propagating information over the global graph (e.g., through message passing). To account for the potential interactions on a per actor level, the autonomous vehicle can distribute the interactions determined using the global graph to the individual actor-specific graphs. The autonomous vehicle can then predict a motion trajectory for an actor based on the associated actor-specific graph, which captures the actor-to-actor interactions and actor-to-map relations.

Aspects of the present disclosure can provide a number of technical effects and improvements. This includes providing advantages over techniques that utilize a single vector for motion forecasting, generate a fully-connected graph among all actors (without lane information), and/or rely on regression-based predictors. For instance, actors can move quickly, traversing large regions. Compressing context information of a large region (to model the motion of these actors) into a single vector can be difficult. Moreover, only building a fully-connected graph among all actors (without lane information) can ignore important map structures, which can be helpful for modeling actor interactions. For regression-based predictors, the regression header may not explicitly leverage the lane information, which could provide a good inductive bias for accurate predictions. As a consequence, regression-based predictors can forecast unrealistic trajectories that fail to account for in-lane travel.

The present disclosure resolves these challenges by providing computing systems and methods that can forecast the motion of actors by constructing an actor-specific graph, along with node embeddings that encode the past motion and map semantics. In particular, an actor and its context can be represented in a distributed and map-aware manner by constructing an actor-specific graph. The actor-specific graph can be constructed by following the topology of lanes that are relevant to this actor, where nodes on this graph correspond to small spatial regions (e.g., lane segments) along these lanes and edges represent the topological and spatial relations among these regions. Compared to using a single vector to encode all the information of a large region, the present disclosure can naturally preserve the map structure and can capture the more fine-grained information, as each node embedding only needs to represent the local context of the actor within a smaller region.

As described herein, to model interactions, the actor-specific graphs of all actors can be projected to a global lane graph and then the information can be propagated over this global graph. Since the actor-specific graphs of interacting actors are highly relevant, those actors can share overlapping regions on the global graph, thus having more frequent communications during the information propagation compared to irrelevant actors. Future motions can be predicted on each actor-specific graph in a fully-convolutional manner, such that small regions along lanes (e.g., represented as nodes in the actor-specific graph) can serve as anchors and provide improved priors for forecasting.

Furthermore, the technology of the present disclosure can improve the efficiency of computational resource usage onboard an autonomous platform. For example, previous forecasting systems may first rasterize both an actor's trajectory as well as the map to form a two-dimensional, birds-eye-view (BEV) image, and then crop the underlying representation centered in the actor's location in BEV. However, rasterizations can be prone to information loss such as connectivities among lanes. Furthermore, it can be an inefficient representation since actor motions can be expanded typically in the direction along the lanes rather than across them. By instead using the graph representations described herein, the systems and methods of the present disclosure allow for more accurate motion prediction while using less processing resources, memory resources, etc.

More particularly, these graph representations can preserve lane topology structure while remaining computationally compact, thus increasing the efficiency of processing and storing these representations for each actor.

In an aspect, the present disclosure provides a computer-implemented method for motion forecasting and planning. The method includes obtaining data associated with a plurality of actors within an environment of an autonomous vehicle and map data indicating a plurality of lanes of the environment. The method includes generating, using a machine-learned model framework comprising one or more machine-learned models, a plurality of actor-specific graphs respectively encoding features for a plurality of actors based on the data associated with the plurality of actors and the map data wherein the plurality of actor-specific graphs include a first actor-specific graph and a second actor-specific graph respectively associated with a first actor and a second actor. The method includes determining using the machine-learned model framework, an interaction between the first actor and the second actor at least in part by propagating features between the first actor-specific graph and the second actor-specific graph. The method includes determining a predicted motion trajectory of the first actor based on the interaction between the first actor and the second actor and the first actor-specific graph.

In some implementations, the first actor-specific graph encodes features for the first actor. For example, the first actor-specific graph includes a plurality of nodes representing lane segments of one or more lanes of the plurality of lanes of the environment, the one or more lanes being relevant to the first actor. The first actor-specific graph also includes a plurality of edges representing relationships between at least a portion of the lane segments. The first actor-specific graph also includes a plurality of node embeddings indicative of at least one lane feature of at least one lane segment and a past motion of the first actor.

In some implementations, the at least one lane feature includes at least one of: (i) a geometric feature or (ii) a semantic feature. The geometric feature indicates at least one of: (1) a center location of the at least one lane segment, (2) an orientation of the at least one lane segment, or (3) a curvature of the at least one lane segment. The semantic feature indicates at least one of: (1) a type of the at least one lane segment or (2) an association of the at least one lane segment with a traffic sign or a traffic light.

In some implementations, the relationships between at least the portion of the lane segments indicate that a respective lane segment is at least one of the following with respect to another lane segment: (i) a predecessor, (ii) a successor, (iii) a left neighbor, or (iv) a right neighbor.

In some implementations, the data associated with the plurality of actors is indicative of the past motion of the first actor. The past motion is indicative of one or more previous locations of the first actor at one or more previous timesteps.

In some implementations, the method further includes determining for the first actor, one or more relevant lanes from the plurality of lanes of the environment based on a past motion of the first actor.

In some implementations, determining, using the machine-learned model framework, the interaction between the first actor and the second actor at least in part by propagating features between the first actor-specific graph and the second actor-specific graph includes generating, using the machine-learned model framework, a global graph based on the plurality of actor-specific graphs. The global graph includes a plurality of global nodes representing lane segments of the plurality of lanes of the environment. The method includes determining, using the machine-learned model framework, the interaction between the first actor and the second actor based on the global graph.

In some implementations, determining, using the machine-learned model framework, the interaction between the first actor and the second actor at least in part by propagating features between the first actor-specific graph and the second actor-specific graph includes generating a global node embedding for a respective global node of the global graph based on a pooling of a plurality of neighboring nodes of the plurality of actor-specific graphs and distributing the global node embedding to the first actor-specific graph to reflect the interaction between the first actor and the second actor.

In some implementations, determining a predicted motion trajectory of the first actor based on the interaction between the first actor and the second actor and the first actor-specific graph includes determining a predicted goal of the first actor based on the first actor-specific graph and determining a curvature of the predicted motion trajectory based on the predicted goal of the first actor, a current position of the first actor, and a direction of the first actor.

In some implementations, the method furthers include determining a vehicle motion trajectory for the autonomous vehicle based on the predicted motion trajectory of the first actor. The method further includes initiating motion control of the autonomous vehicle based on the vehicle motion trajectory.

In another aspect, the present disclosure provides an autonomous vehicle control system including one or more processors, and one or more computer-readable medium storing instructions that when executed by the one or more processors cause the autonomous vehicle control system to perform operations. The operations include obtaining data associated with a plurality of actors within an environment of an autonomous vehicle and map data indicating a plurality of lanes of the environment. The operations include generating, using a machine-learned model framework including one or more machine-learned models, a plurality of actor-specific graphs for the plurality of actors based on the data associated with the plurality of actors and the map data and wherein a respective actor-specific graph of the plurality of actor-specific graphs for a respective actor of the plurality of actors is associated with one or more lanes of the plurality of lanes of the environment, the one or more lanes being relevant to the respective actor. The operations may include generating, using the machine-learned model framework, a global graph based on the plurality of actor-specific graphs, wherein the global graph is associated with the plurality of actors and the plurality of lanes of the environment. The operations may include determining, using the machine-learned model framework, an interaction between the respective actor and at least one other actor of the plurality of actors based on the global graph. The operations may include determining a predicted motion trajectory of the respective actor based on the interaction and the actor-specific graph of the respective actor.

In some implementations, the machine-learned model framework includes a convolution operator configured to update at least one node of the respective actor-specific graph based on a feature from a neighboring node of the at least one node.

In some implementations, the machine-learned model framework includes an encoder configured to aggregate updated node embeddings from a first convolutional layer of the respective actor-specific graph into an embedding that is applicable to the node embeddings of the respective actor-specific graph.

In some implementations, generating, using the machine-learned model framework, a global graph based on the plurality of actor-specific graphs includes projecting the plurality of actor-specific graphs to the global graph to create a plurality of global node embeddings of the global graph. Determining, using the machine-learned model framework, an interaction between the respective actor and at least one other actor of the plurality of actors based on the global graph includes determining the interaction based on at least a portion of the global node embeddings.

In some implementations, the respective actor-specific graph includes a plurality of nodes representing lane segments of one or more lanes of the plurality of lanes of the environment. The one or more lanes are relevant to the respective actor. The respective actor-specific graph includes a plurality of edges representing relationships between at least a portion of the lane segments and a plurality of node embeddings indicative of at least one lane feature of at least one lane segment and a past motion of the respective actor.

In some implementations, the operations further include determining a vehicle motion trajectory for the autonomous vehicle based on the predicted motion trajectory of the first actor. The operations further include communicating data descriptive of the vehicle motion trajectory for execution by the autonomous vehicle.

In another aspect, the present disclosure provides an autonomous vehicle including one or more processors and one or more computer-readable medium storing instructions that when executed by the one or more processors cause the autonomous vehicle to perform operations. The operations include obtaining data associated with a plurality of actors within an environment of the autonomous vehicle and map data indicating a plurality of lanes of the environment. The operations include generating, using a machine-learned model framework including one or more machine-learned models, a plurality of actor-specific graphs respectively encoding features for a plurality of actors. The plurality of actor-specific graphs include a first actor-specific graph and a second actor-specific graph respectively associated with a first actor and a second actor. The operations may include determining, using the machine-learned model framework, an interaction between the first actor and the second actor at least in part by propagating features between the first actor-specific graph and the second actor-specific graph. The operations may include determining a predicted motion trajectory of the first actor based on the interaction and the first actor-specific graph. The operations may include initiating an autonomy operation of the autonomous vehicle based on the predicted motion trajectory of the respective actor.

In some implementations, the respective actor-specific graph includes a plurality of nodes representing lane segments of the one or more lanes of the plurality of lanes of the environment, the one or more lanes being associated with a region of interest to the respective actor. The respective actor-specific graph includes a plurality of edges representing relationships between at least a portion of the lane segments. The respective actor-specific graph includes a plurality of node embeddings indicative of at least one lane feature of at least one lane segment and a past motion of the respective actor.

In some implementations, the autonomy operation includes planning the motion of the autonomous vehicle.

Other example aspects of the present disclosure are directed to other systems, methods, vehicles, apparatuses, tangible non-transitory computer-readable media, and devices for generating data (e.g., scene representations, simulation data, training data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 is a diagram of convolution and pooling operators, according to some implementations of the present disclosure;

FIGS. 7-9 are flowcharts of methods for determining an actor trajectory and controlling an autonomous vehicle, according to some implementations of the present disclosure;

FIG. 11 is a flowchart of a method for training a machine-learned model, according to some implementations of the present disclosure.

DETAILED DESCRIPTION

The following describes the technology of this disclosure within the context of an autonomous vehicle for example purposes only. As described herein, the technology is not limited to an autonomous vehicle and can be implemented within other robotic and computing systems.

Figure 1:
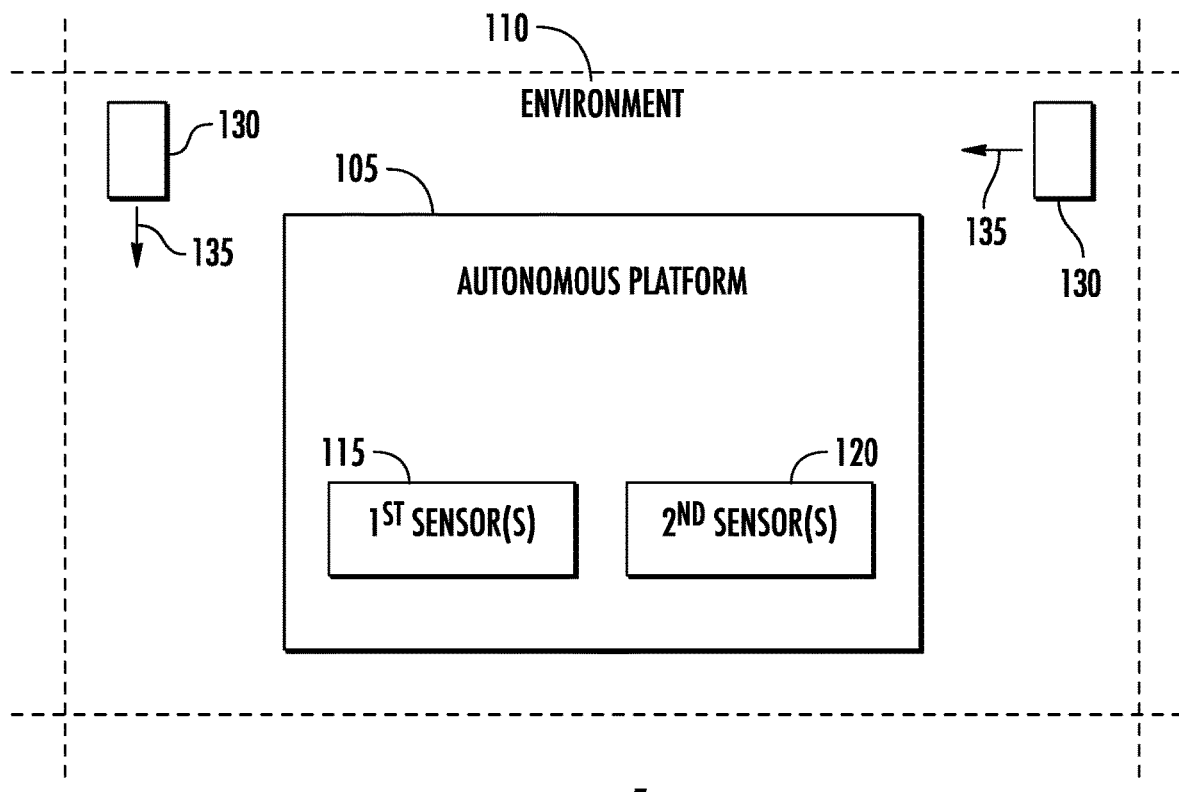
FIG. 1 is a block diagram of a computing platform, according to some implementations of the present disclosure.

With reference now to FIGS. 1-11, example implementations of the present disclosure will be discussed in further detail. FIG. 1 depicts a block diagram of an example operational scenario 100 according to example implementations of the present disclosure. The operational scenario 100 includes an autonomous platform 105 and an environment 110. The environment 110 can be external to the autonomous platform 105. The autonomous platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), etc. An indoor environment, for example, can include environments enclosed by a structure such as a building (e.g., a service depot, manufacturing facility, etc.).

The environment 110 can include one or more actors 130 (e.g., simulated objects, real-world objects, etc.). The actor(s) 130 can be dynamic object(s) 130 and can include any number of moveable objects such as, for example, one or more pedestrians, animals, vehicles, etc. The actor(s) 130 can move within the environment according to one or more trajectories 135. Although trajectories 135 are depicted as emanating from actor(s) 130, it is also to be understood that relative motion within the environment 110 can include one or more trajectories of the autonomous platform 105 itself.

The autonomous platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks. By way of example, the autonomous platform 105 can include an autonomous truck, including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

Figure 2:
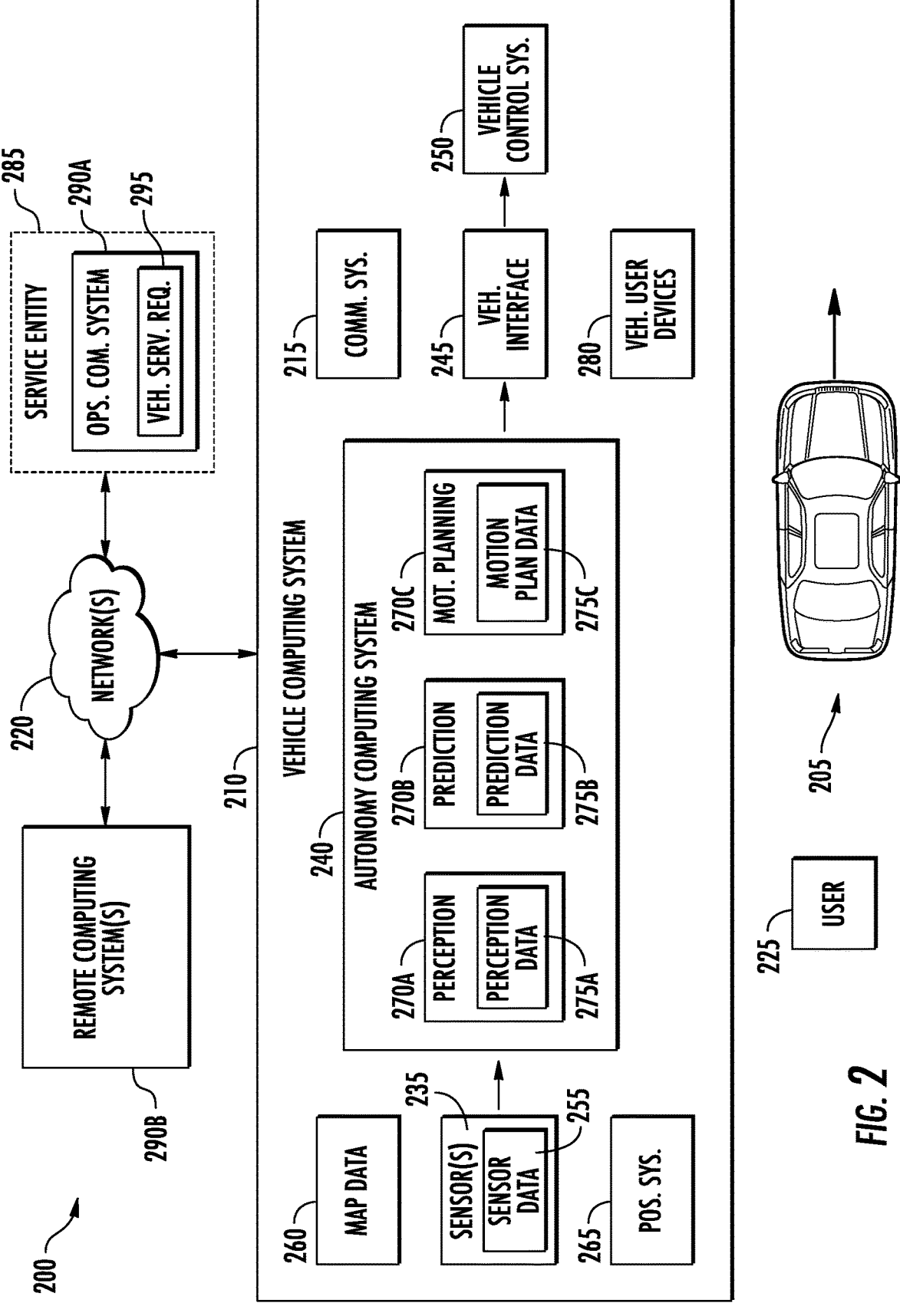
FIG. 2 is a block diagram of an autonomous vehicle system, according to some implementations of the present disclosure.

FIG. 2 depicts an example system overview 200 of the autonomous platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. For example, the vehicle computing system 210 can represent or be an autonomous vehicle control system for the autonomous vehicle 205 and can be configured to perform the operations and functions described herein for forecasting actor motion, planning/controlling autonomous vehicle motion, etc.

Generally, the vehicle computing system 210 can obtain sensor data 255 from sensor(s) 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include overseeing the vehicle 205 and/or coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more devices associated with a service entity (e.g., coordinating and managing a vehicle service), one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data, performing autonomy functions, predicting object trajectories and generating vehicle motion trajectories, controlling the vehicle 205, communicating with other computing systems, updating machine-learned model parameters based on training (e.g., using simulated traffic scenes), etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three-hundred-and-sixty-degree view of the surrounding environment. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred-and-sixty-degree view of a surrounding environment of the autonomous vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain multi-modal sensor data indicative of one or more static or dynamic objects within an environment of the autonomous vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects, such as other objects (e.g., in motion or likely to be in motion, etc.) in the vehicle's environment, such as people, animals, machines, vehicles, etc. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle 205 was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) can travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction/forecasting 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction/forecasting system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict/forceast a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of waypoints. In some implementations, the prediction data 275B can be indicative of the speed or acceleration at which the respective object is predicted to travel along its associated predicted motion trajectory. The vehicle computing system 210 can utilize one or more algorithms and one or more machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more waypoints (with associated coordinates). The waypoint(s) can be future location(s) for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objectives (e.g., cost functions, such as cost functions based at least in part on dynamic objects, speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan can define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C (e.g., motion plan(s)) for the vehicle 205 (e.g., multiple times per second, etc.). Each new motion plan can describe a motion of the vehicle 205 over the next planning period (e.g., waypoint(s)/locations(s) over the next several seconds, etc.). Moreover, a motion plan can include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 by a certain number of degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include or otherwise be in communication with the one or more vehicle user devices 280. For example, the vehicle computing system 210 can include, or otherwise be in communication with, one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sensor data indicative of an environment (and objects/features within) at different time steps. In some implementations, the training data can include a plurality of environments previously recorded by the autonomous vehicle with one or more actors. In some implementations, the training data can include simulated training data.

Figure 3:
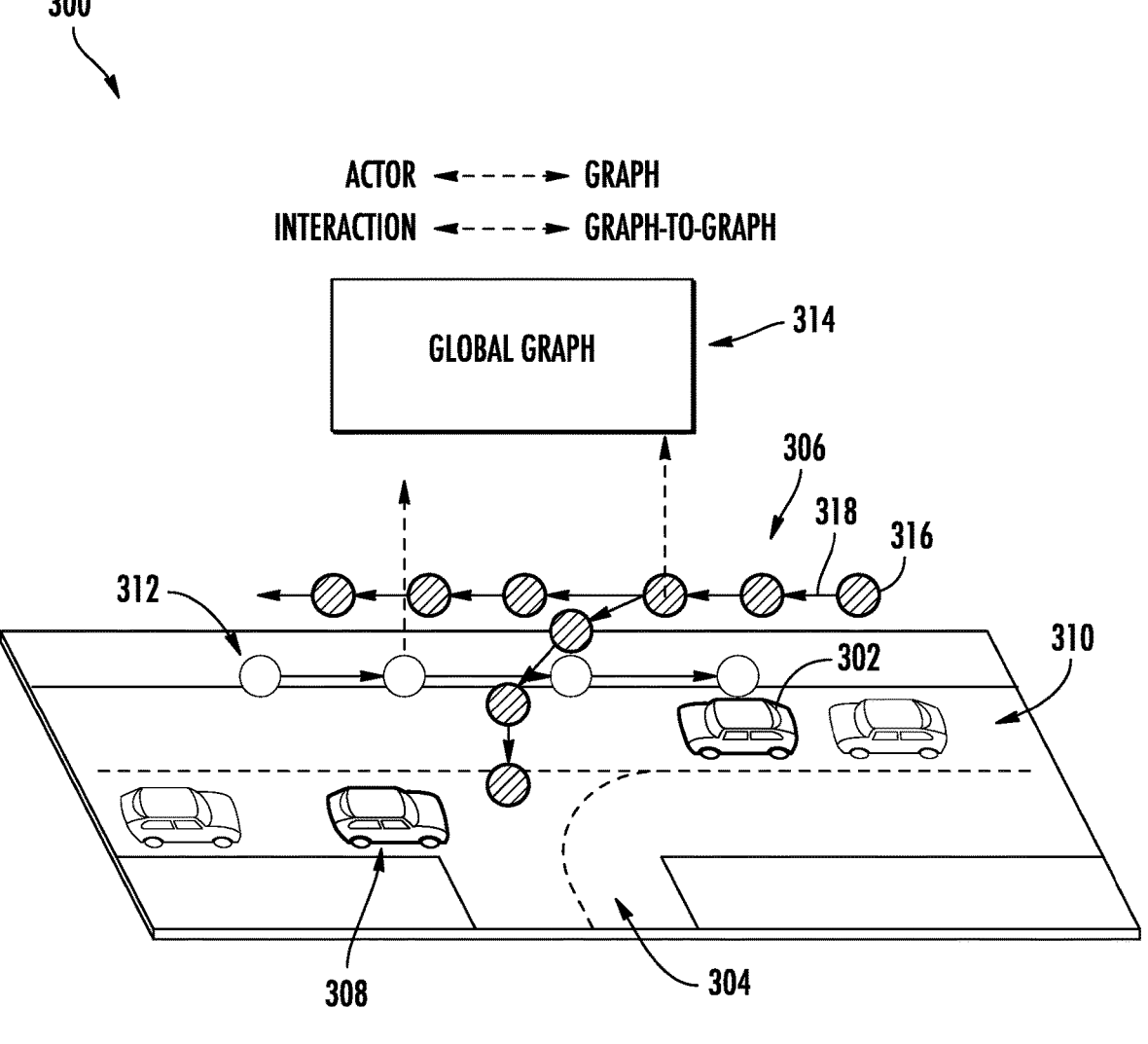
FIG. 3 is a diagram of actor graphs, according to some implementations of the present disclosure.

To improve the performance of an autonomous platform, such as the autonomous vehicle of FIG. 2, the technology of present disclosure can leverage actor data and map data to generate both actor-specific graphs and a global graph to account for actor-specific contexts, map topology, and actor-to-actor interactions. For example, FIG. 3 depicts an example of such a graph and a corresponding scene. FIG. 3 illustrates a first actor 302 (e.g., a first vehicle) and a second actor 308 (e.g., a second vehicle), traversing a travel way. The travel way can be within an environment of an autonomous vehicle (not shown in FIG. 3). The travel way can include, for example, a roadway. The environment can include a plurality of lanes (e.g., vehicle travel lanes). The first actor 302 may desire to turn from a first road 310, onto a different road 304, thus departing a first lane on the road 310. The second actor 308 may desire to continue straight, moving forward in its lane on road 310. Using the technology of the present disclosure, a computing system (e.g., an autonomous vehicle control system, another system associated with an autonomous vehicle) can better forecast the motion of each actor based on the actors' past motion, current position within the lane topology of the environment, and a potential interaction between the two actors.

To help do so, the computing system can represent an actor and its context by constructing actor-specific graphs 306 and 312 using a machine-learned model framework (e.g., including neural networks). An actor-specific graph can include nodes, edges, and/or node embeddings. For example, the actor-specific graph 306 can include nodes 316 that represent lane segments of the lanes within the environment that are relevant to an actor 302. For example, each lane can be composed of a plurality of consecutive lane segments. The lane segments can be short segments along the centerline of the lane. A lane segment can have relationships with another segment in the same lane or in another lane (e.g., a pairwise relationship). The lanes that are relevant to an actor can include the lanes within a region of interest to the actor. This can include, for example, lane(s) in which the actor has previous traveled, is currently travelling, and/or is predicted to travel (e.g., based on past motion, current location, heading, etc.) and/or adjacent lanes thereto. The relevant lanes can therefore include lane segments that are also relevant to the actor.

The actor-specific graph 306 can include edges 318 that represent the relationships between the lane segments. For example, the edges 318 can indicate that a particular lane segment is left of another lane segment, right of another lane segment, a predecessor of another lane segment, and/or a successor of another lane segment.

Figure 5:
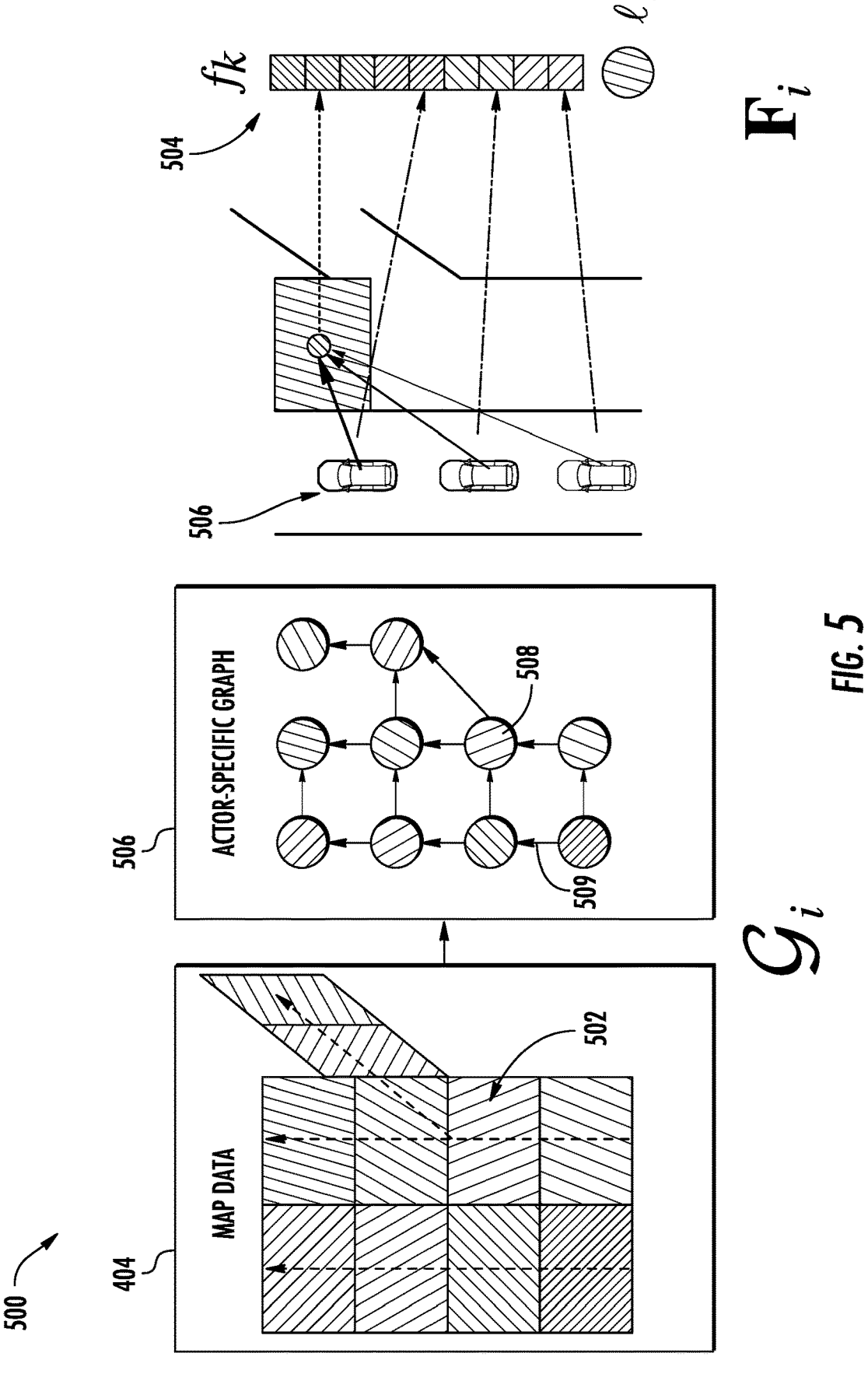
FIG. 5 is a diagram of components of an actor-specific graph, according to some implementations of the present disclosure.

The actor-specific graph 306 can include node embeddings (e.g., as shown in FIG. 5 and further described herein) that encode the past motion of the actor and map features. For example, the node embeddings of actor-specific graph 306 can include a plurality of node embeddings that are indicative of at least one lane feature of at least one lane segment and a past motion of the first actor 302. A lane feature can include at least at least one of: (i) a geometric feature or (ii) a semantic feature of a respective lane segment. Geometric features can be descriptive of the geometry/layout of the respective lane segment. For example, geometric feature(s) can indicative at least one of: (1) a center location of the at least one lane segment, (2) an orientation of the at least one lane segment, or (3) a curvature of the at least one lane segment. Semantic features can include binary features of the lane segment. These can help describe the nature and intended purpose of the associated lane. For example, semantic feature(s) can indicate at least one of (1) a type of the at least one lane segment (e.g., turning lane, merging lane, exit ramp) or (2) an association of the at least one lane segment with a traffic sign, a traffic light and/or another type of traffic element.

Using this structure, each actor-specific graph 306, 312 can focus on the lane topology that is relevant to the specific actor 302, 308 associated with the actor-specific graph, given the respective actor's past motion, current position, and/or heading. Actor-specific graphs 306, 312 naturally preserve the map structure of the environment and capture more fine-grained information, as each node embedding can represent the local context within a smaller region relevant to the respective actor 302, 308 rather than trying to capture the entire scene.

A computing system can utilize the actor-specific graphs 306, 312 to help determine an interaction between actors. For example, the computing system can determine an interaction between the first actor 302 and the second actor 308 at least in part by propagating features between the first actor-specific graph 306 and the second actor-specific graph 312. This can include generating a global graph 314 based on the plurality of actor-specific graphs 306, 312. The global graph 314 can be associated with the plurality of actors (e.g., first actor 302 and second actor 308) and the plurality of lanes of the environment (e.g., the lanes relevant to each actor-specific graph). The global graph 314 can allow the computing system (e.g., of an autonomous vehicle) to determine which actors may interact with one another by propagating information over the global graph 314 (e.g., through message passing). To account for the potential interactions on a per actor level, the computing system can distribute the interactions determined using the global graph 314 to the individual actor-specific graphs 306, 312. This can allow the actor-specific graphs to reflect the interactions between actors in the environment. For example, by distributing the interactions determined through the global graph 314, the first actor-specific graph 306 can reflect the potential interactions of the first actor 302 with respect to the second actor 308. Likewise, the second actor-specific graph 312 can reflect the potential interactions of the second actor 308 with respect to the first actor 302. The computing system can then predict a motion trajectory for an actor based on the associated actor-specific graphs 306 and 312 (which capture the actor-to-actor interactions and actor-to-map relations). For example, the computing system can determine a predicted motion trajectory of the first actor 302 based on the interaction (between the actors 302, 308) and the first actor-specific graph 306 such that the first actor 302 avoids the second actor 308. Additionally, or alternatively, the computing system can determine a predicted motion trajectory of the second actor 308 based on the interaction (between the actors 302, 308) and the second actor-specific graph 312 such that the second actor 308 avoids the second actor 302.

Figures 4A, 4B:
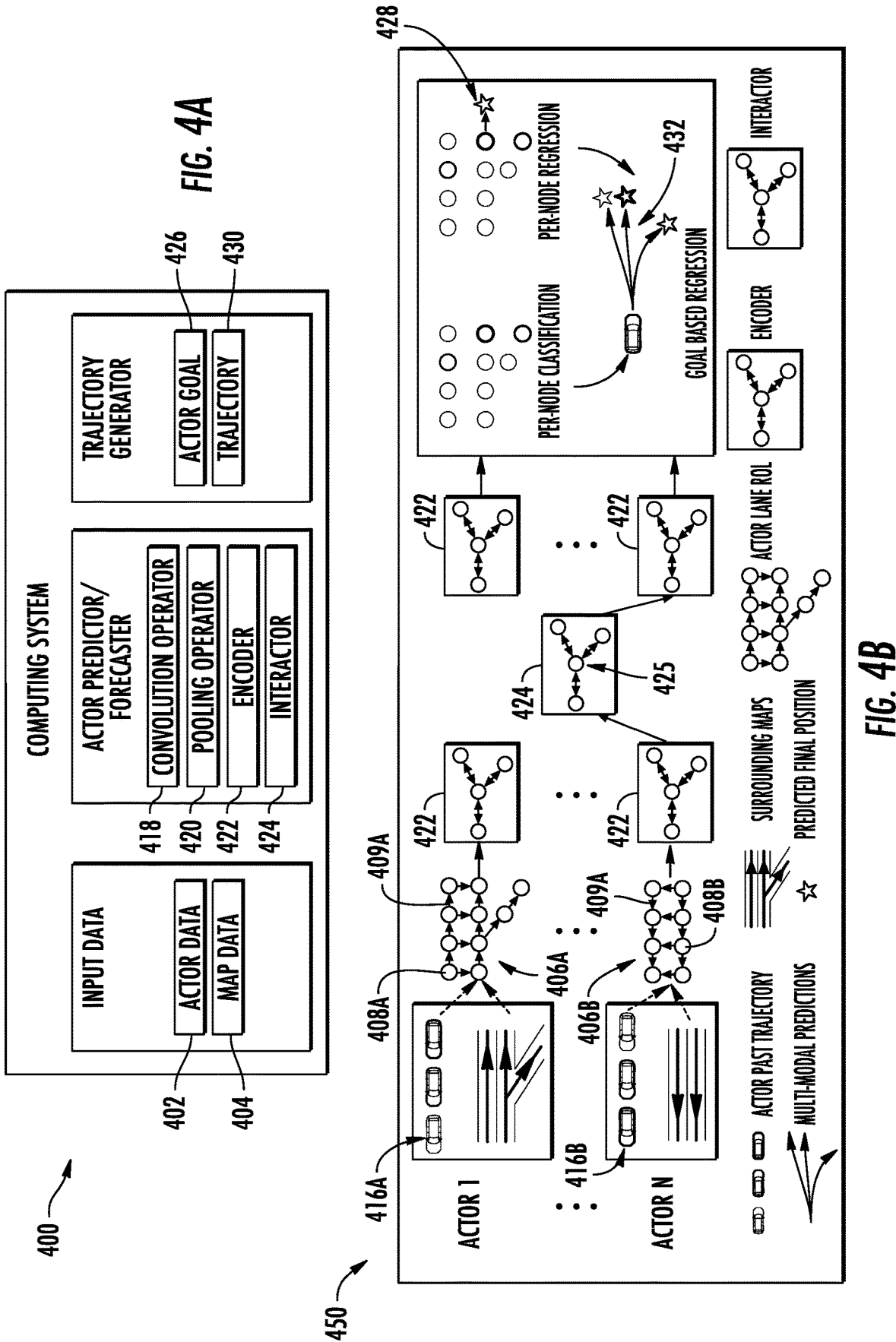
FIG. 4A is a diagram of a computing system, according to some implementations of the present disclosure.
FIG. 4B is a diagram of a machine-learned model framework, according to some implementations of the present disclosure.

To generate the actor-specific graphs and the global graphs, as well as predict actor motion trajectories, a computing system can leverage a machine-learned model framework. FIGS. 4A and 4B are diagrams of such a computing system 400 and a machine-learned model framework 450, according to some implementations of the present disclosure. FIG. 4A depicts an example system 400 configured to perform actor motion forecasting within the surrounding environment of an autonomous platform. The computing system 400 can be, for example, an autonomous vehicle control system for an autonomous vehicle. The computing system 400 can be included in and/or include any of the system(s) (e.g., autonomous platform 105, vehicle 205, vehicle computing system 210, remote computing system 290B, operations computing system 290A, etc.) described herein such as, for example, with reference to FIGS. 1, 2, etc.

The computing system 400 can be configured to process sensor data to determine a plurality of actors and forecast their motion in the surrounding environment. To do so, the computing system 400 can obtain data associated with a plurality of actors within an environment of an autonomous vehicle and map data 404 indicating a plurality of lanes of the environment. The data associated with the plurality of actors within the environment of the autonomous vehicle can be actor data 402. For instance, the actor data 402 can be indicative of the past motion of the actor(s) 416A-B. The actor(s) 416A-B can correspond to the actors 302, 308. The past motion of the actors(s) 416A-B can be indicative of one or more previous locations of the respective actor at one or more previous timesteps. In some implementations, the past motion of the i-th actor can be expressed as a set of 2D points encoding the center locations over the past particular number (e.g., L) timesteps (e.g., $\{(x_i^{-L}, y_i^{-L}), \ldots, (x_i^{-1}, y_i^{-1})\}$, where (x, y) can express the 2D coordinates in bird's eye view (BEV). As further described herein, this can help forecast the future motions of all actors in the environment (e.g., $\{(x_i^0, y_i^0), \ldots, (x_i^T, y_i^T) | i=1, \ldots, N\}$ where T can express a prediction horizon and N can express the number of actors).

The map data 404 can be associated with the environment in which the computing system 400 (e.g., an autonomous vehicle) is operating. The map data 404 can include a BEV raster HD map, lane graph, etc. For example, the map data 404 can be indictive of the lanes and associated semantic attributes (e.g., turning lane, traffic light controlled lane, etc.) of the environment. Actors 416A-B can be more likely to follow lanes represented in the map data 404. The map data 404 can help determine the right of way, which can in turn affect the interactions among actors 416A-B.

As shown in FIG. 5, a lane can be composed of multiple consecutive lane segments 502 (e.g., $l_i$). The lane segments 502 can be short segments along the centerline of the lane. As described herein, a lane segment 502 can have a relationship with another segment 502 (e.g., $l_j$) in the same lane or in another lane. For example, a first lane segment can be a successor or a left neighbor of a second lane segment.

Returning to FIGS. 4A-B, the computing system 400 can be configured to forecast the motion of the first actor 416A and second actor 416B. To do so, the computing system 400 can include a convolutional operator 418, a pooling operator 420, an encoder 422, and an interactor module 424. These components can help the computing system 400 leverage the machine-learned model framework 450 to forecast actor motion.

The machine-learned model framework 450 can include one or more machine-learned models. The machine-learned models can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks. The model(s) can include graph neural networks.

The machine-learned model framework 450 can be configured to generate actor-specific graphs for a plurality of actors. For instance, the computing system 400 can generate, using the machine-learned model framework 450, a plurality of actor-specific graphs 406A-B for the plurality of actors 416A-B based on the actor data 402 associated with a plurality of actors 416A-B and the map data 404. A respective actor-specific graph 406A-B of the plurality of actor-specific graphs, for a respective actor 416A-B of the plurality of actors, can be associated with one or more lanes of the plurality of lanes of the environment. In an example actor-specific graph 406A-B, the one or more lanes are relevant to the respective actor. Each actor-specific graph 406A-B can include a plurality of nodes 408A-B and a plurality of edges 409A as well as node embeddings.

For example, FIG. 5 shows a respective actor-specific graph 506 than can correlate to either of the actor-specific graphs 406A-B of FIG. 4. The actor specific graph 506 can include a plurality of nodes 508 representing lane segments of one or more lanes of the plurality of lanes of the environment (the one or more lanes being relevant to the respective actor). The respective actor-specific graph 506 can include a plurality of edges 509 (e.g., between successive nodes 508) representing relationships between at least a portion of the lane segments 502. A respective actor-specific graph 506 can also include a plurality of node embeddings 504 indicative of at least one lane feature of at least one lane segment and a past motion of the respective actor 516.

To help construct an actor-specific graph 506, the computing system 400 can determine one or more lanes that are relevant to an actor 516 to help identify a region of interest for the actor 516. For example, the computing system 400 can determine that one or more lanes are relevant to an actor 516 based on the past motion of the actor 516. Additionally, or alternatively, the computing system 400 can determine the relevant lanes for the actor 516 based on the current location/position, orientation, heading, speed, acceleration, etc. of the actor 516. The computing system 400 can evaluate the previous locations of the actor 516, its current location, and its heading to determine which lanes the actor 516 has travelled in, is travelling in, and/or may travel in as well as the neighboring lanes.

By way of example, the actor 516 and its contextual information can be represented by rasterizing both its past trajectory (e.g., described in actor data 402 of FIG. 4) as well as the map data 404 to form a 2D BEV image and then crop the underlying representation centered in the actor's location in BEV. The computing system 400 can identify the relevant lane(s) for an actor 516 based on an observed history horizon (e.g., L) and a certain prediction horizon (e.g., T), identifying lanes where the actor 516 has travelled and/or may travel. The relevant lanes can be used to generate an actor-specific graph 506. Accordingly, in some implementations, the actor-specific graph 506 can be expressed as:

$$\mathcal{G}_i = \{v, \{\varepsilon_{suc}, \varepsilon_{pre}, \varepsilon_{left}, \varepsilon_{right}\}\}$$

A node 508 (e.g., $v \in V$) can represent a corresponding lane segment 502 within those lanes. The lane topology can be represented by different types of edges 509 (e.g., $\varepsilon_r$). Specifically, the lane topology can encode a predecessor, successor, left, and right neighbor. More than one node 508 can be connected by an edge 509 (e.g., $e \in \varepsilon_r$) if the corresponding lane segments 502 have a relation (e.g., r). For example, a first lane segment can be a successor of a second lane segment, which can be represented as nodes 508 in the actor-specific graph 506 connected by an edge 509.

In some implementations, the actor-specific graph 506 can characterize map structures around an i-th actor 516. For example, the actor-specific graph 506 can be augmented with a set of node embeddings 504. The node embeddings 504 (e.g., $f_k \in \mathbb{R}^C$) can capture the geometric and semantic information of the lane segment/node 502/508, as well as its relations with the actor 516. As described herein, the geometric features can include the center location, orientation, curvature, etc. of the lane segment/node 502/508. The semantic features can include, for example, binary features indicating if the lane segment/node 502/408 is a turning lane, if it is currently controlled by a traffic light, etc.

The computing system 400 can encode information related to the actor 516 into the node embeddings 504. For example, the computing system 400 can identify the past motion of an actor 516 as a set of 2D displacements. Even more particularly, identifying the past motion of an actor 516 as a set of 2D displacements can define the movements between consecutive timesteps. The relative positions and orientations of the 2D displacements can be included with respect to the lane segment/node 502/508 into the node embeddings 504 which can encode motion(s) of an actor 516 in a map-dependent manner. For example, a trajectory that steadily deviates from one lane and approaches the neighboring lane can be considered highly likely to be a lane change. In some implementations, the actor 516 information can be clamped such that lane segments/nodes 502/508 that are more than a predetermined distance (e.g., 5, 10, 15, 20, 25, etc. meters away from the actor) can be represented as motion embeddings in the node embeddings 504 with zeros. Such restriction can encourage the associated model(s) to learn better representations via message passing over the actor-specific graph 506.

The machine-learned model framework 450 can include a convolution operator 418 and a pooling operator 420 (shown in FIG. 4) to help generate and update an actor-specific graph 516. This can help overcome irregular graph structure of the actor-specific graph 516 (e.g., a lane based region of interest).

For example, FIG. 6 is a diagram of the convolution operator 418 and the pooling operator 420, according to some implementations of the present disclosure. The convolution operator 418 can be configured to update at least one node of the respective actor-specific graph 506 based on a feature from a neighboring node of the at least one node. In particular, the convolution operator 418 can update features (e.g., an output feature 604) by aggregating features from its neighborhood (e.g., in the graph). This can include the aggregation of input features 602. For example, a binary adjacency matrix can be illustrated by $\varepsilon_i(r)$ for $\mathcal{G}_i$ under the relation r (e.g., the (p,q) entry in this matrix is one (1) if lane segments 502 have the relation r and 0 otherwise). For instance, lane segments 502, from FIG. 5, can indicate a relation r between two graph nodes 508. In some implementations, the n-hop connectivity can be illustrated under the relation r as the matrix bool $(\varepsilon_i(r)\cdot\varepsilon_i(r)\ldots\varepsilon_i(r))$=bool$(\varepsilon_i^n(r))$. The operator bool can set any non-zero entry to one and otherwise keep them as zero. Accordingly, in some implementations, the output node 606 can be updated as follows:

$$F_i \leftarrow \Psi\left(F_i W + \sum_{r,n} \text{bool}\,(\mathcal{E}_i^n(r))F_i W_{n,r}\right)$$

where both W and $W_{n,r}$ can be learnable parameters. In particular, $\Psi(\bullet)$ can illustrate a non-linearity including neural network training systems such as systems that normalize the activities of the neurons. Even more particularly, the summation can be over all possible relations r and hops n (e.g., n ∈ {1, 2, 4, 8, 18, 32}). Specifically, a multi-hop mechanism can mimic a dilated convolution and enlarge a receptive field.

In some implementations, the neural network training systems can use layer normalization by computing a mean and variance used for normalization from all of the summed inputs to the neurons in a layer on a single training case. Specifically, each neuron can be given its own adaptive bias and gain which are applied after the normalization but before the non-linearity. Even more specifically, layer normalization can perform the same computation at training and test times. In particular, layer normalization can be applied to recurrent neural networks by computing the normalization statistics separately at each time step.

In some implementations, the neural network training systems can use rectified linear units. For example, Restricted Boltzmann machines can be generalized by replacing each binary unit with an infinite number of copies which can all have the same weights but have progressively more negative biases. In particular, the learning and inference rules for the replaced units can be unchanged from Restricted Boltzmann machines using binary stochastic hidden units. Even more particularly, they can be approximated efficiently by noisy, rectified linear units.

A lane pooling operator 420 can use a learnable pooling function. In particular, given an actor-specific graph 506, a lane pooling operator 420 can pool, or "interpolate" a pooling feature 610 of an arbitrary 2D vector 608 (e.g., v) from features. In some implementations, the arbitrary 2D vector 608 can be a lane segment 502 in another graph (e.g., spatially close to the graph). As such, lane pooling can help communicate information back and forth between graphs, which is described in greater detail below with respect to actor-to-actor interaction prediction.

To generate the pooling feature 610 of an arbitrary 2D vector 608, the computing system 400 can obtain neighboring nodes 612. For example, the computing system 400 can retrieve neighboring nodes 612 by checking if the center distance between a lane segment 502 and arbitrary 2D vector 608 is smaller than a certain threshold. The computing system 400 can use a relative pose and some non-linearities to learn a pooling function. In particular, the set of neighboring nodes 612 can be expressed as $\mathcal{N}$. The relative pose between the arbitrary 2D vector 608 and lane segment 502 can be expressed as $\Delta_{pk}$ which can include relative position and orientation. Accordingly, in some implementations, the pooling feature 610 can be expressed as:

$$f_v = \mathcal{M}_b\left(\sum_{k\in N} \mathcal{M}_a([f_k, \Delta_{vk}])\right)$$

Where [ . . . ] can express concatenation and $\mathcal{M}$ can express a two-layer multi-layer perceptron (MLP).

Returning to FIG. 4, the computing system can leverage an encoder 422. For instance, the machine-learned framework 450 can include an encoder 422 configured to aggregate updated node embeddings from a first convolutional layer of a respective actor-specific graph 406A-B into an embedding that is applicable to the node embeddings of the respective actor-specific graph 406A-B. For example, the computing system 400 can utilize the encoder 422 to encode input information such as actor data 402 and map data 404 into node embeddings for a particular actor 416A-B. The computing system 400 can apply multiple convolution layers (e.g., 4 layers) to obtain updated node embeddings. The lane convolution layers can propagate information from a node 408A-B to connected nodes (e.g., multi-hop).

In some implementations, the computing system 400 can leverage a graph shortcut mechanism on an actor-specific graph 406A-B. The graph shortcut layer can be applied after any layer of convolution. For example, the computing system 400 can aggregate $F_i$ output from a previous layer into a node embedding (that is applicable to all other nodes) with the same dimensions as node embeddings of that particular actor-specific graph 416A-B, and then add it to embeddings of all nodes in the respective actor-specific graph 416A-B ($\mathcal{G}_i$). As described herein, the past motions of an actor can be expressed as 2D vectors (e.g., movements between consecutive timesteps). The computing system 400 can utilize lane pooling (e.g., by the pooling operator 420) to extract features for these 2D vectors representing past actor motions. In some implementations, a 1D convolutional neural network can then be applied to these features to build a final shortcut embedding.

Using the machine-learned model framework 450, the computing system 400 can determine an interaction between a first actor 416A and the second actor 416B at least in part by propagating features between the first actor-specific graph 406A and the second actor-specific graph 406B. The computing system 400 can utilize the interactor module 424 to determine the interaction between actors. For example, the computing system 400 can use the machine-learned model framework 450 (e.g., the interactor module 424) to generate a global graph 425 based on the plurality of actor-specific graphs 416A-B. The global graph can be associated with the plurality of actors 416A-B and the plurality of lanes of the environment. For instance, the computing system 400 can build the global graph 425 such that it contains all lanes in a scene. The computing system 400 can project the plurality of actor-specific graphs 416A-B to the global graph 425 to create a plurality of global node embeddings of the global graph 425. The computing system 400 can apply plurality of convolution layers (e.g., 4 layers) on the global graph 425 to perform message passing between the nodes. The computing system 400 can distribute the global node embeddings of the global graph 425 back to each actor-specific graph 406A-B to reflect potential interactions between actors. For example, the actor-specific graphs 406A-B can be encoded from previous layers and a global graph 425. For each node in the global lane graph 425, the computing system 400 can utilize lane pooling to construct its embedding (e.g., by pooling operator 420). Neighbors from actor-specific graphs 416A-B can be retrieved and measured by center distance. The pooling feature can be applied (e.g., by pooling operator 420) to ensure each global node has the information of all actors 416A-B that it could interact with. Thus, in the machine-learned model framework 450, the actor-specific graphs 406A-B can share the same global graph 425, where they can communicate with each other following map structures. The computing system 400 can determine the interaction based on at least a portion of the global node embeddings (e.g., the portion relevant to the particular actor of interest).

To distribute the information from the global graph 425, the computing system 400 can find neighbors for each node in the global graph 425. The computing system 400 can apply lane pooling and the resulted embedding can be added to the original node embeddings of the actor-specific graphs 406A-B (e.g., serving as a skip-connection).

By way of example, the first actor-specific graph 406A and the second actor-specific graph 406B can be projected to the global graph 425. The global graph 425 can reflect a potential interaction between the first actor 406A and the second actor 406B in a space-time region in which the actor's paths may overlap (e.g., as the first actor 416A makes a left turn across the lane of the second actor 416B). The computing system 400 can project the global graph 425 (e.g., its global node embeddings) to the first actor-specific graph 406A and to the second actor-specific graph 406B such that the first actor-specific graph 406A and the second actor-specific graph 406B reflect the interaction between the first actor 416A and the second actor 416B. Such an interaction can be reflected in the nodes/node embeddings of the actor-specific graphs 416A-B to indicate which lane segments may include an interaction between the first actor 416A and the second actor 416B.

The computing system 400 (e.g., a trajectory model 430) can determine a predicted motion trajectory 432 of the respective actor 416A-B based on the interaction and the actor-specific graph 406A-B of the respective actor 416A-B. For example, the computing system 400 can determine a predicted motion trajectory 432 of the first actor 416A based on the interaction between the first actor 416A and the second actor 416B and the first actor-specific graph 406A.

To help do so, the computing system 400 can determine a predicted goal 428 of the first actor 416A based on the first actor-specific graph 406A. For instance, the first actor 416A can take many different yet possible future motions. In particular, different modalities can be characterized by different goals of the first actor 416A generated by an actor goal model 426. Even more particularly, a predicted goal 428 can refer to a final position of an actor at the end of a prediction horizon. For example, an actor can follow lane structures and thus their goals can be characterized as close to a lane segment. In some implementations, the actor goal model 426 can be model (e.g., a machine-learned model) configured predict a goal 428 of the first actor 416A in a fully convolutional manner. For example, the actor goal model 426 can predict the goal 428 of the first actor 416A based on feature(s) of the first actor-specific graph 406A. For example, the actor goal model 426 can apply a 2-layer multi-layer perceptron on each node feature such that a number of values can be output (e.g., the probability that a lane segment is the closest lane segment to a final destination, relative residues from a lane segment to a final destination, etc.).

The computing system 400 can determine a curvature of the predicted motion trajectory 432 based on the predicted goal 428 of the first actor 416A, a current position of the first actor 416A, and a direction of the first actor 416A. For example, the computing system 400 (e.g., the trajectory model 430) can input the values output by the actor goal model 426 to generate the top K goal predictions (e.g., K=6), at least one of which can be selected. For each of the top goal predictions, the position and direction of the actor 416 at time t=0 can be used as well as those at the goal 428 to interpolate a curve. For example, the curve can be interpolated using Bezier quadratic parameterizations.

In some implementations, the trajectory model 430 can unroll a constant acceleration kinematic model along the curve. In particular, 2D points can be sampled at each future timestep based on the curve and the kinematic information. The 2D points can form a trajectory 432, which can serve as an initial proposal of the final forecasting. In some implementations, the trajectory proposals can be refined using a learnable header. For example, a lane pooling function followed by a 1D convolutional neural network can be used to pool features. The computing system 400 can decode a pair of values per timestep. Specifically, the pair of values can represent the residue from the trajectory proposal to the ground-truth future position at this timestep (e.g., encoded in Frenet coordinate of a trajectory proposal).

Ultimately, the computing system 400 can select a predicted motion trajectory 432 for the actor from the trajectory proposal(s). The computing system 400 can utilize the selected predicted motion trajectory 432 to determine a vehicle motion trajectory for the autonomous vehicle based on the predicted motion trajectory of the first actor 416A. This can include developing a motion plan that includes one or more vehicle motion trajectories, which avoid the first actor 416A and its predicted future locations. The computing system 400 can communicate data descriptive of the vehicle motion trajectory for execution by the autonomous vehicle (e.g., via its vehicle interface, control devices).

FIGS. 7-9 are flowcharts of methods for determining an actor trajectory and controlling an autonomous vehicle, according to some implementations of the present disclosure. One or more portion(s) of these methods can be implemented by a computing system that includes one or more computing devices such as, for example, the computing systems described with reference to the other figures (e.g., FIGS. 1-6, 10). Each respective portion of the methods can be performed by any (or any combination) of one or more computing devices. Moreover, one or more portion(s) of the methods can be implemented as an algorithm on the hardware components of the device(s) described herein (e.g., as in FIGS. 1-6, 10, etc.), for example, to determine actor motion trajectories and/or control the autonomous vehicle. FIGS. 7-9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIGS. 7-9 may be described with reference to elements/ terms described with respect to other systems and figures for exemplary illustrated purposes and is not meant to be limiting. One or more portions of these methods can be performed additionally, or alternatively, by other systems.

At (702), the method 700 can include obtaining data associated with a plurality of actors within an environment of an autonomous vehicle and map data indicating a plurality of lanes of the environment. For instance, a computing system (e.g., an autonomous vehicle control system of an autonomous vehicle) can obtain data associated with a plurality of actors within an environment of an autonomous vehicle and map data indicating a plurality of lanes of the environment. As described herein, the data associated with the plurality of actors can be indicative of the past motion of the first actor. The past motion can be indicative of one or more previous locations of the first actor at one or more previous timesteps. The map data can indicate a plurality of lane segments for each of the lanes within the environment of the autonomous vehicle.

At (704), the method 700 can include determining, for an actor, one or more relevant lanes from the plurality of lanes of the environment. For instance, the computing system can determine, for the first actor, one or more relevant lanes from the plurality of lanes of the environment based on a past motion of the first actor. The past motion can help indicate where the actor may travel and its intentions (e.g., to change lanes). Additionally, or alternatively, the relevant lane(s) can be determined based on the current location of the first actor, a heading of the first actor, a speed of the first actor, etc. A similar such process can be utilized for a second actor within the environment, a third actor within the environment, etc.

At (706), the method 700 can include generating, using a machine-learned model framework including one or more machine-learned models, a plurality of actor-specific graphs respectively encoding features for a plurality of actors based on the data associated with the plurality of actors and the map data. For instance, the computing system can generate, using a machine-learned model framework including one or more machine-learned models, a plurality of actor-specific graphs respectively encoding features for a plurality of actors based on the data associated with the plurality of actors and the map data. The plurality of actor-specific graphs can include a first actor-specific graph and a second actor-specific graph respectively associated with a first actor and a second actor.

As described herein, an actor-specific graph can include a variety of features encoded in the graph structure. For example, a first actor-specific graph for a first actor can include a plurality of nodes representing lane segments of one or more lanes of the plurality of lanes of the environment (e.g., the one or more lanes being relevant to the first actor). The first actor-specific graph can include a plurality of edges representing relationships between at least a portion of the lane segments. The relationships between at least the portion of the lane segments indicate that a respective lane segment is at least one of the following with respect to another lane segment: (i) a predecessor, (ii) a successor, (iii) a left neighbor, or (iv) a right neighbor.

The first actor-specific graph can include a plurality of node embeddings indicative of at least one lane feature of at least one lane segment and a past motion of the first actor. The at least one lane feature can include at least one of: (i) a geometric feature or (ii) a semantic feature. The geometric feature can indicate at least one of: (1) a center location of the at least one lane segment, (2) an orientation of the at least one lane segment, or (3) a curvature of the at least one lane segment. The semantic feature can indicate at least one of: (1) a type of the at least one lane segment or (2) an association of the at least one lane segment with a traffic sign or a traffic light.

At (708), the method 700 can include determining, using the machine-learned model framework, an interaction between actors at least in part by propagating features between actor-specific graphs. For example, the computing system can determine, using the machine-learned model framework, an interaction between the first actor and the second actor at least in part by propagating features between the first actor-specific graph and the second actor-specific graph. To do so, the computing system can generate a global graph for modeling the interaction(s) between actors.

For example, with reference to FIG. 8, determining an interaction can include method 800. At (802), the method 800 can include generating, using the machine-learned model framework, a global graph based on the plurality of actor-specific graphs. As described herein, the global graph can include a plurality of global nodes representing lane segments of the plurality of lanes of the environment, as well as the features of the actor-specific graphs. Furthermore, at (804), the method 800 can include determining, using the machine-learned model framework, the interaction between the first actor and the second actor based on the global graph. For example, the computing system can generate a global node embedding for a respective global node of the global graph based on a pooling of a plurality of neighboring nodes of the plurality of actor-specific graphs. The computing system can distribute the global node embedding to the first actor-specific graph to reflect the interaction between the first actor and the second actor. This allows the actor-specific graphs to represent the potential actor-to-actor interaction(s) and the relevant environmental context.

Returning to FIG. 7, at (710), the method 700 can include determining a predicted motion trajectory of a respective actor based on the interaction and the actor-specific graph of the respective actor. For example, the computing system can determine a predicted motion trajectory of the first actor based on the interaction between the first actor and the second actor and the first actor-specific graph. For example, the computing system can predict the motion trajectory of the first actor based on the nodes/lane segments that the first actor is likely to traverse, while avoiding the second actor.

In some implementations, determining the predicted motion trajectory of the first actor can include performing the operations of method 900. At (902), the method 900 can include determining a predicted goal of the first actor based on the first actor-specific graph, as described herein. At (904), the method 900 can include determining a curvature of the predicted motion trajectory based on the predicted goal of the first actor, a current position of the first actor, and a direction of the first actor.

Returning to FIG. 7, at (712), the method 700 can include initiating an autonomy operation of the autonomous vehicle based on the predicted motion trajectory of the respective actor. For instance, the autonomy operation can include planning the motion of the autonomous vehicle. The computing system can determine a vehicle motion trajectory for the autonomous vehicle based on the predicted motion trajectory of the first actor. The vehicle motion trajectory can include one or more future locations of the autonomous vehicle that avoid interference with the first actor. The computing system can initiate motion control of the autonomous vehicle based on the vehicle motion trajectory. This can include providing data indicative of the vehicle motion trajectory such that the autonomous vehicle travels in accordance with the vehicle motion trajectory (e.g., its waypoints).

Figure 10:
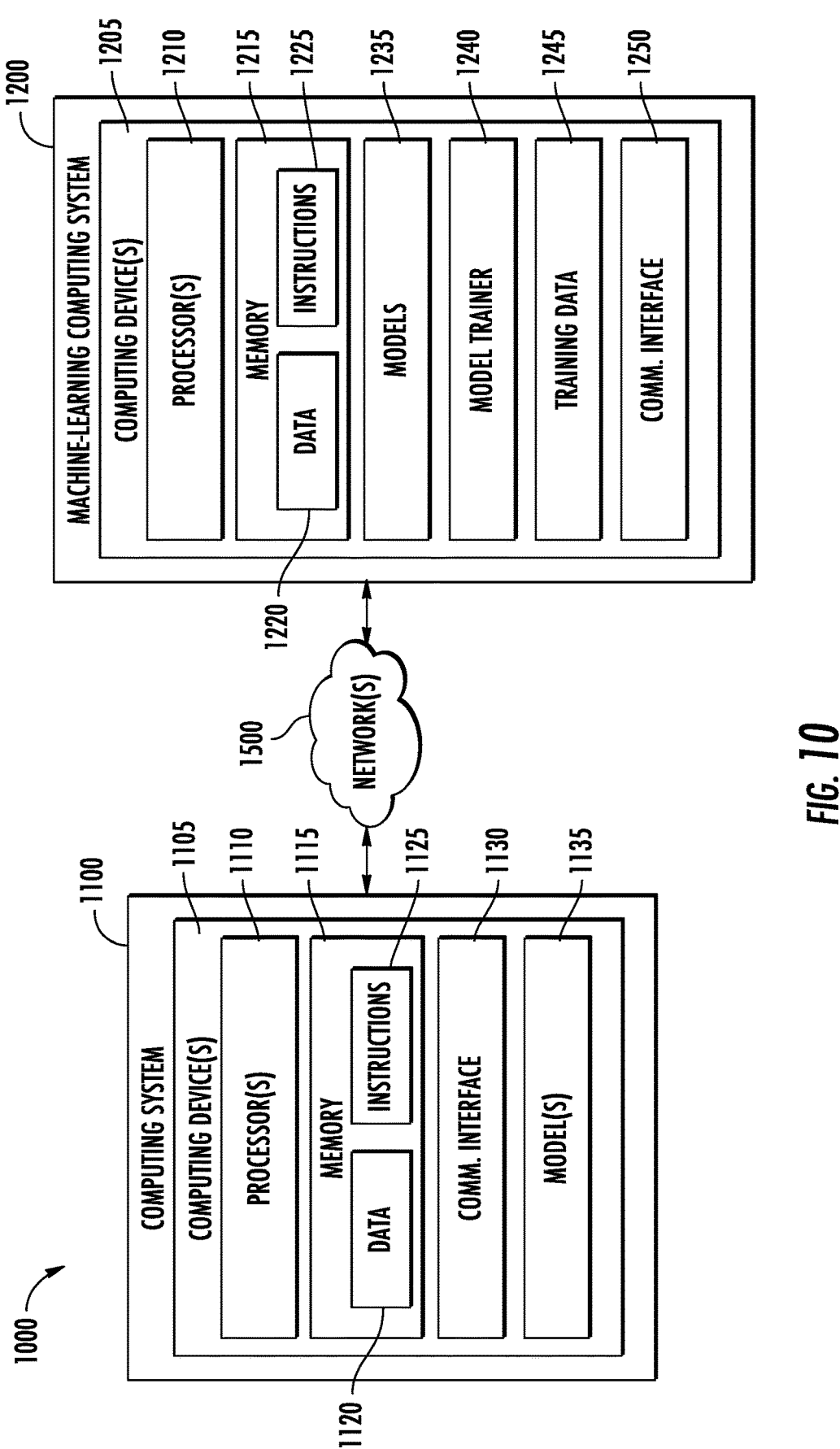
FIG. 10 is a block diagram of a computing system, according to some implementations of the present disclosure.

FIG. 10 depicts a block diagram of an example system 1000 according to example embodiments of the present disclosure. The example system 1000 includes a computing system 1100 and a machine learning computing system 1200 that are communicatively coupled over one or more networks 1300.

In some implementations, the computing system 1100 can perform one or more observation tasks such as, for example, by obtaining sensor data associated with an environment. In some implementations, the computing system 1100 can be included in an autonomous platform. For example, the computing system 1100 can be on-board an autonomous vehicle. In other implementations, the computing system 1100 is not located on-board an autonomous platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices, etc.) can store data 1120 that can be obtained, received, accessed, written, manipulated, created, or stored. The data 1120 can include, for instance, sensor data, map data (e.g., including lane information), feature data, data associated with a vehicle (e.g., past motion, position, heading, orientation, planned future motion), actor-specific graphs, global graphs, trajectory data, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110. The memory 1115 can include a multi-scale memory, as described herein.

For example, the memory 1115 can store instructions 1125 that when executed by the one or more processors 1110 cause the one or more processors 1110 (the computing system 1100) to perform any of the operations, functions, or methods/processes described herein, including, for example, obtaining sensor data, performing the methods/processes/techniques for determining actor trajectories, generating graphs (e.g., actor-specific graphs, global graphs), motion planning based on the actor trajectories, etc.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks. The model(s) 1135 can include graph neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110, etc.). In particular, the computing system 1100 can implement the machine-learned model(s) 1135 to generate actor-specific graphs, global graphs, actor trajectories, vehicle trajectories, etc.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices, etc.) can store data 1220 that can be obtained, received, accessed, written, manipulated, created, or stored. The data 1220 can include data similar to data 1120 and/or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations, functions, methods, or processes described herein, including, for example, training machine-learned model(s) of a machine-learned model framework like that described herein, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, labeled data indicative of portions of one or more environments at different timesteps. The training data can include actors, lane segments, actor trajectories, goals, etc. that can be used to train the model to perform the operations and functions described herein with reference to FIGS. 3-9. In some implementations, the training data can include environment(s) previously recorded by the autonomous vehicle with one or more objects. The model trainer 1240 can be implemented in hardware, firmware, or software controlling one or more processors.

The model trainer 1240 can be configured to implement a training method/process for training the model(s) of the machine-learned model framework described herein. For instance, FIG. 11 depicts a flowchart of a method 1300 for training an example machine-learned model according to aspects of the present disclosure. One or more portion(s) of the method 1300 can be implemented by a computing system that includes one or more computing devices such as, for example, the computing systems described with reference to the other figures. Each respective portion of the method 1300 can be performed by any (or any combination) of one or more computing devices. Moreover, one or more portion(s) of the method 1300 can be implemented as an algorithm on the hardware components of the device(s) described herein, for example, to train machine-learned model(s). FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 may be described with reference to elements/terms described with respect to other systems and figures for exemplary illustrated purposes and is not meant to be limiting. One or more portions of method 1300 can be performed additionally, or alternatively, by other systems.

At (1302), the method 1300 can include generating training data for training a first machine-learned model. For example, a computing system (e.g., a model trainer, etc.) can generate the training data for training the first machine-learned model. The training data can include a plurality of training samples with training actors within a training environment. The training environment can include lanes made up of lane segments. The training data can include ground truth vehicle trajectories for model analysis and feedback.

In some implementations, the training data can be collected using one or more autonomous platforms or the sensors thereof. By way of example, the training data can be collected using one or more autonomous vehicle(s) or sensors thereof as the vehicle(s) operates along one or more travel ways. The training data can include LIDAR point clouds (e.g., collected using LIDAR sensors, etc.), RADAR sweeps (e.g., collected using RADAR sensors, etc.), images (e.g., collected using camera sensors, etc.) or high definition map information (e.g., structured lane topology data, etc.). The plurality of training samples can include map data for training and evaluation. In some implementations, "ground-truth" labels or ground truth maps can be created in which objects or features can be identified. In some implementations, the training data can include simulation data.

At 1304, the method 1300 can include selecting a training instance based, at least in part, on the training data. For example, a computing system can select the training instance based, at least in part, on the training data. The training instance can include training samples indicative of at least a portion of a surrounding environment with a plurality of actors and a plurality of lanes.

At 1306, the method 1300 can include inputting the training instance into a first machine-learned model. For example, a computing system can input the training instance into the first machine-learned model.

At 1308, the method 1300 can include generating loss metric(s) for the first machine-learned model based on output(s) of at least a portion of the first machine-learned model in response to the training instance. For example, a computing system can generate the loss metric(s) for the first machine-learned model based on the output(s) of at least the portion of the first machine-learned model in response to the training instance. The model(s) of the machine-learned framework (e.g., the first machine-learned model) can be trained based on a goal classification loss, a goal regression loss, and a trajectory refinement loss. The goal classification loss can include a binary cross entropy loss. The goal regression loss can include a smooth-L1 loss. The trajectory refinement loss can include a smooth-L1 loss based on ground-truth actor trajectories.

In some implementations, the model(s) of the machine-learned framework can be trained end-to-end with a loss containing the goal classification loss $\mathcal{L}_{cls}$, the goal regression loss $\mathcal{L}_{reg}$, and the trajectory refinement loss $\mathcal{L}_{refine}$. Accordingly, in some implementations, training system can be expressed as:

$$\mathcal{L}_{=}\mathcal{L}_{cls}+\alpha\,\mathcal{L}_{reg}+\beta\,\mathcal{L}_{refine}$$

Where $\alpha$ and $\beta$ can be hyperparameters determining relative weights of different terms.

In some implementations, as the computing system predicts the goal classification and regression results per node, a binary cross entropy loss for Las with online hard example mining can be adopted. In particular, a smooth-L1 loss for $\mathcal{L}_{reg}$, where $\mathcal{L}_{reg}$ is evaluated on positive nodes (e.g., closest lane segments to the ground-truth final positions), can be adopted. $\mathcal{L}_{refine}$ can be a smooth-L1 loss with training labels generated on the fly. For example, ground-truth future trajectories can be projected to the predicted trajectory proposals, and the Frenet coordinate values can be used as regression targets.

At 1310, the method 1300 can include modifying at least the portion of the first machine-learned model based, at least in part, on at least one of the loss metric(s). For example, a computing system can modify at least the portion of the first machine-learned model based, at least in part, on at least one of the loss metric(s). For example, the first machine-learned model (or portion thereof) can be modified to minimize a loss function associated with the loss metric(s).

Returning to FIG. 10, the computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks 1500. In some implementations, a communication interface 1130/1250 can include, for example, one or more of a communications controller, receiver, transceiver, transmitter, port, conductors, software or hardware for communicating data.

The network(s) 1500 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1500 can be accomplished, for instance, through a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1100 can include the model trainer 1240 and the training dataset 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems

1100 or 1200. Such configurations can be implemented without deviating from the scope of the present disclosure.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

What is claimed is:

1. A computer-implemented method comprising:
  (a) obtaining data associated with a plurality of actors within an environment of an autonomous vehicle;
  (b) obtaining map data indicating a plurality of lanes of the environment;
  (c) for a respective actor of the plurality of actors:
    determining one or more relevant lanes from the plurality of lanes; and
    associating a plurality of local node embeddings with a plurality of nodes representing lane segments of the one or more relevant lanes and one or more edges representing relationships between at least a portion of the lane segments, wherein the plurality of local node embeddings encode information related to the respective actor;

(d) generating, based on the local node embeddings for the plurality of actors, a plurality of global node embeddings for the plurality of nodes;

(e) determining, based on the plurality of global node embeddings, a plurality of motion trajectories for the plurality of actors; and (f) controlling the autonomous vehicle based on a vehicle motion trajectory selected for the autonomous vehicle based on the plurality of motion trajectories for the plurality of actors.

2. The computer-implemented method of claim 1, wherein the one or more edges indicate one or more of:

that a particular lane segment is left of another lane segment, that a particular lane segment is right of another lane segment, that a particular lane segment is a predecessor of another lane segment, or that a particular lane segment is a successor of another lane segment.

3. The computer-implemented method of claim 1, wherein the information related to the respective actor comprises data describing a past motion of the respective actor and map features.

4. The computer-implemented method of claim 1, wherein at least one local node embedding of the plurality of local node embeddings encodes map information comprising one or more of: a geometric lane feature or a semantic lane feature.

5. The computer-implemented method of claim 4, wherein the geometric lane feature comprises feature data indicating one or more of:

a center location of a particular lane segment, an orientation of a particular lane segment, or a curvature of a particular lane segment.

6. The computer-implemented method of claim 4, wherein the semantic lane feature comprises feature data indicating a nature and intended purpose of an associated lane.

7. The computer-implemented method of claim 6, wherein the semantic lane feature comprises feature data indicating one or more of:

a type of a particular lane segment, or an association of a particular lane segment with a traffic sign, a traffic light, or another type of traffic element.

8. The computer-implemented method of claim 1, wherein (d) comprises, for a respective global node and a corresponding global node embedding of the plurality of global node embeddings:

pooling information from a respective plurality of the local node embeddings for a respective plurality of actors that could interact with the respective global node; and adding the pooled information to the respective global node.

9. The computer-implemented method of claim 1, comprising:

determining interactions between the plurality of actors by propagating information over the global node embeddings.

10. An autonomous vehicle control system for controlling an autonomous vehicle, the autonomous vehicle control system comprising:

one or more processors; and one or more non-transitory, computer-readable media storing instructions that are executable by the one or more processors to cause the autonomous vehicle control system to perform operations, the operations comprising:

(a) obtaining data associated with a plurality of actors within an environment of an autonomous vehicle;

(b) obtaining map data indicating a plurality of lanes of the environment;

(c) for a respective actor of the plurality of actors:

determining one or more relevant lanes from the plurality of lanes; and associating a plurality of local node embeddings with a plurality of nodes representing lane segments of the one or more relevant lanes and one or more edges representing relationships between at least a portion of the lane segments, wherein the plurality of local node embeddings encode information related to the respective actor;

(d) generating, based on the local node embeddings for the plurality of actors, a plurality of global node embeddings for the plurality of nodes;

(e) determining, based on the plurality of global node embeddings, a plurality of motion trajectories for the plurality of actors; and (f) controlling the autonomous vehicle based on a vehicle motion trajectory selected for the autonomous vehicle based on the plurality of motion trajectories for the plurality of actors.

11. The autonomous vehicle control system of claim 10, wherein the one or more edges indicate one or more of:

that a particular lane segment is left of another lane segment, that a particular lane segment is right of another lane segment, that a particular lane segment is a predecessor of another lane segment, or that a particular lane segment is a successor of another lane segment.

12. The autonomous vehicle control system of claim 10, wherein at least one local node embedding of the plurality of local node embeddings encodes map information comprising one or more of: a geometric lane feature or a semantic lane feature.

13. The autonomous vehicle control system of claim 12, wherein the geometric lane feature comprises feature data indicating one or more of:

a center location of a particular lane segment, an orientation of a particular lane segment, or a curvature of a particular lane segment.

14. The autonomous vehicle control system of claim 12, wherein the semantic lane feature comprises feature data indicating a nature and intended purpose of an associated lane.

15. The autonomous vehicle control system of claim 14, wherein the semantic lane feature comprises feature data indicating one or more of:

a type of a particular lane segment, or an association of a particular lane segment with a traffic sign, a traffic light, or another type of traffic element.

16. The autonomous vehicle control system of claim 10, wherein (d) comprises, for a respective global node and a corresponding global node embedding of the plurality of global node embeddings:

pooling information from a respective plurality of the local node embeddings for a respective plurality of actors that could interact with the respective global node; and adding the pooled information to the respective global node.

17. The autonomous vehicle control system of claim 10, comprising:

determining interactions between the plurality of actors by propagating information over the global node embeddings.

18. One or more non-transitory, computer-readable media storing instructions that are executable by one or more processors to cause an autonomous vehicle control system to perform operations, the operations comprising:

(a) obtaining data associated with a plurality of actors within an environment of an autonomous vehicle;

(b) obtaining map data indicating a plurality of lanes of the environment;

(c) for a respective actor of the plurality of actors:

determining one or more relevant lanes from the plurality of lanes; and associating a plurality of local node embeddings with a plurality of nodes representing lane segments of the one or more relevant lanes and one or more edges representing relationships between at least a portion of the lane segments, wherein the plurality of local node embeddings encode information related to the respective actor, (d) generating, based on the local node embeddings for the plurality of actors, a plurality of global node embeddings for the plurality of nodes;

(e) determining, based on the plurality of global node embeddings, a plurality of motion trajectories for the plurality of actors; and (f) controlling the autonomous vehicle based on a vehicle motion trajectory selected for the autonomous vehicle based on the plurality of motion trajectories for the plurality of actors.

19. The one or more non-transitory, computer-readable media of claim 18, wherein the one or more edges indicate one or more of:

that a particular lane segment is left of another lane segment, that a particular lane segment is right of another lane segment, that a particular lane segment is a predecessor of another lane segment, or that a particular lane segment is a successor of another lane segment.

\* \* \* \* \*